(12) United States Patent
Ronen

(10) Patent No.: US 10,278,154 B2
(45) Date of Patent: Apr. 30, 2019

(54) COMPUTERIZED METHOD FOR BUILDING A MULTISENSORY LOCATION MAP

(71) Applicant: Navin Systems Ltd., Binyamina (IL)

(72) Inventor: Shai Ronen, Binyamina (IL)

(73) Assignee: NAVIN SYSTEMS LTD., Binyamina (IL)

( * ) Notice: Subject to any disclaimer, the term of this patent is extended or adjusted under 35 U.S.C. 154(b) by 0 days.

(21) Appl. No.: 15/899,929

(22) Filed: Feb. 20, 2018

(65) Prior Publication Data

US 2018/0255528 A1   Sep. 6, 2018

Related U.S. Application Data

(62) Division of application No. 14/355,606, filed as application No. PCT/IL2012/050426 on Oct. 30, 2012, now Pat. No. 10,111,197.

(60) Provisional application No. 61/554,556, filed on Nov. 2, 2011.

(51) Int. Cl.
| | |
|---|---|
| *H04W 24/00* | (2009.01) |
| *H04W 64/00* | (2009.01) |
| *G01S 5/02* | (2010.01) |
| *H04W 4/02* | (2018.01) |

(52) U.S. Cl.
CPC ........... *H04W 64/00* (2013.01); *G01S 5/0252* (2013.01); *H04W 4/026* (2013.01)

(58) Field of Classification Search
None
See application file for complete search history.

(56) References Cited

U.S. PATENT DOCUMENTS

| | | | |
|---|---|---|---|
| 2009/0043504 A1 | 2/2009 | Bandyopadhyay et al. | |
| 2009/0315706 A1 | 12/2009 | Scalisi et al. | |
| 2010/0039929 A1 | 2/2010 | Cho et al. | |
| 2011/0176494 A1* | 7/2011 | Huang ................ | G01S 5/02 370/329 |

(Continued)

FOREIGN PATENT DOCUMENTS

| | | |
|---|---|---|
| EP | 2046087 | 4/2009 |
| WO | 2009090297 | 7/2009 |

OTHER PUBLICATIONS

International Search Report of PCT Application No. PCT/IL2012/050426 dated Mar. 19, 2013.

*Primary Examiner* — Idowu O Osifade
(74) *Attorney, Agent, or Firm* — Terry M. Sanks, Esq.; Beusse Wolter Sanks & Maire, PLLC

(57) ABSTRACT

A computerized method for building a multisensory location map, the method may include: receiving, by an interface, multiple multisensory data vectors acquired by multiple mobile devices at multiple locations and location estimates indicative of the multiple locations; wherein at least a majority of the multiple locations are located within an area in which a granularity of global positioning system (GPS) based navigation is below an allowable threshold; wherein the location estimates are at least partially generated by internal navigation systems of the multiple mobile devices; and calculating, by a map calculator, in response to the multiple multisensory data vectors and the location estimates, a location fingerprinting map that comprises multiple grid points, wherein each grid point comprises a multisensory grid point fingerprint and grid point location information.

4 Claims, 26 Drawing Sheets

(56) References Cited

U.S. PATENT DOCUMENTS

2012/0143495 A1* 6/2012 Dantu .................. G01C 21/206
                                                                        701/428
2013/0027247 A1 1/2013 Fodor et al.

* cited by examiner

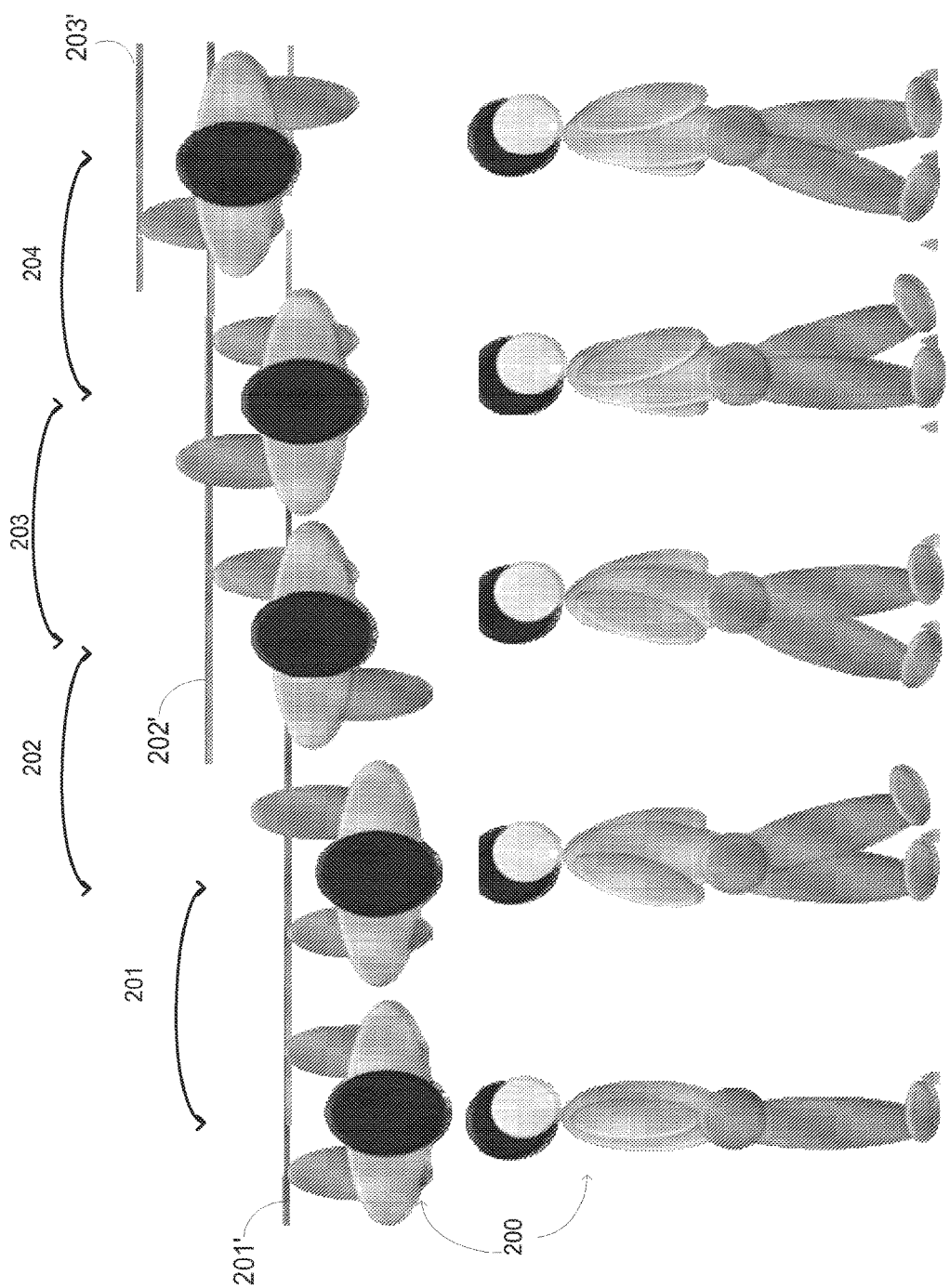

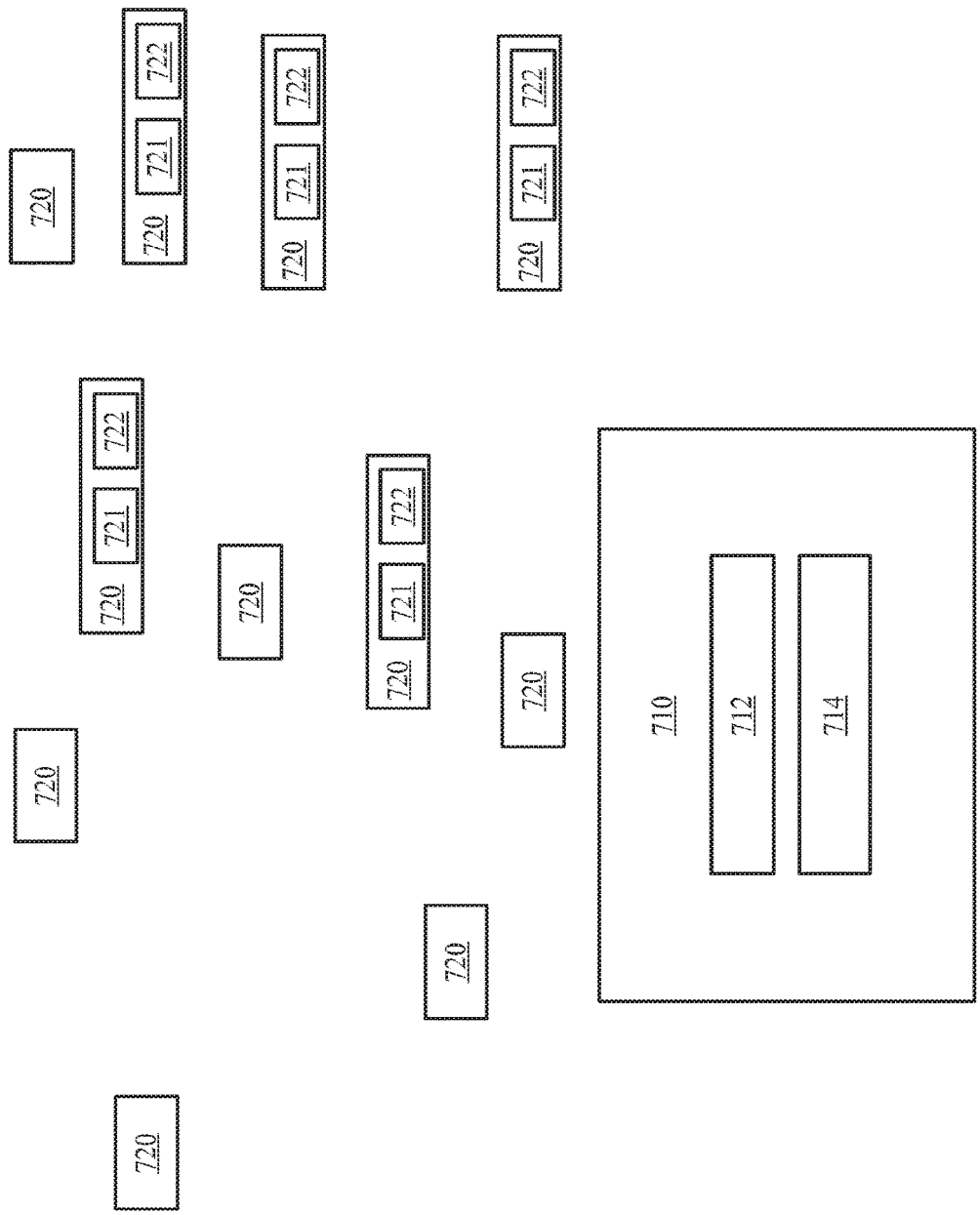

COMPUTERIZED METHOD FOR BUILDING A MULTISENSORY LOCATION MAP

CROSS-REFERENCE TO RELATED APPLICATIONS

This application is a Divisional of U.S. application Ser. No. 14/355,606 filed May 1, 2014, which is a national phase application of PCT International Application No. PCT/IL2012/050426 filed Oct. 30, 2012, which claims the benefit of U.S. Provisional Application No. 61/554,556 filed dated Nov. 2, 2011, all of which are incorporated herein by reference in their entirety.

BACKGROUND OF THE INVENTION

There is a growing need to provide highly accurate positioning information even in indoor spaces or areas in which global positioning system (GPS) based navigation is either impossible or can exhibit unaccepted granularity.

SUMMARY OF THE INVENTION

According to an embodiment of the invention a method may be provided and may include performing any combination of any stages mentioned in the specification.

Further embodiments of the invention include a computer readable medium that is non-transitory and may store instructions for performing the above-described methods and any steps thereof, including any combinations of same. For example, the computer readable medium may store instructions for executing any combination of stages of any method mentioned in the specification.

Additional embodiments of the invention include a system arranged to execute any or all of the methods described above, including any stages—and any combinations of same.

A computerized method for building a multisensory location map may be provided and may include: receiving, by an interface, multiple multisensory data vectors acquired by multiple mobile devices at multiple locations and location estimates indicative of the multiple locations; wherein at least a majority of the multiple locations are located within an area in which an accuracy of global positioning system (GPS) based navigation is below an allowable threshold; wherein the location estimates are at least partially generated by internal navigation systems of the multiple mobile devices; and calculating, by a map calculator, in response to the multiple multisensory data vectors and the location estimates, a location fingerprinting map that may include multiple grid points, wherein each grid point may include a multisensory grid point fingerprint and grid point location information.

The calculating may include correlating, by the map calculator, the multiple multisensory data vectors and the location estimates, to provide the location fingerprinting map.

The method may include repetitively feeding to a mobile device that enters the area, location information for fixing location estimate generated by the internal navigation system of the mobile device.

The method may include updating an accuracy level of grid point location information in response to a number of mobile devices that acquired multisensory data vectors in proximity to the grid point.

The method may include updating an accuracy level of grid point location information in response to an acquisition of location specific electromagnetic signals acquired at a vicinity of the grid point.

The method may include updating an accuracy level of grid point location information in response to global positioning system (GPS) signals acquired in proximity to the grid point.

The method may include detecting indoor space singularity points and updating an accuracy level of grid points located in proximity to the singularity points.

The method may include building a map of the indoor space based upon the content of the location fingerprinting map.

The method may include sending to mobile device directional information in response to a location of the mobile device, a target destination and the location fingerprinting map.

The location fingerprinting map is a three-dimensional map.

The method may include receiving multiple multisensory data vectors acquired by a mobile device at a plurality of indoor locations before receiving a multisensory data vector at a certain location in which the granularity of the GPS based navigation is below the threshold, and increasing an accuracy level of the location estimates of the plurality of indoor locations based upon GPS location information acquired at the certain location.

The method may include receiving multiple multisensory data vectors acquired by a mobile device at a plurality of indoor locations after receiving a multisensory data vector at a certain location in which the granularity of the GPS based navigation is below the threshold, and increasing an accuracy level of the location estimates of the plurality of indoor locations based upon GPS location information acquired at the certain location.

The multisensory data vector may include electromagnetic information.

The multisensory data vector may include at least one out of ambient noise, temperature, earth magnetic field information.

The multisensory data vector may include pedometer information.

The method may include repetitively estimating acceleration of a user and updating mobile phone coordinate system in response to the estimating.

The method may include repetitively estimating acceleration of a user and updating location estimate generated by the internal navigation system of the mobile device in response to the estimating.

There may be provided computerized method for building a multisensory location map, the method may include: receiving location information of a certain location in which a mobile device is located, the location information is acquired by utilizing global positioning system (GPS) based navigation; receiving multiple multisensory data vectors acquired by the mobile device at multiple locations and location estimates indicative of the multiple locations; wherein the location estimates are generated by an internal navigation system of the mobile device; and associating an accuracy level to the location estimates based upon an estimated accuracy of the internal navigation system and a distance of each location from the certain location.

The accuracy level may decrease with an increase of a distance from the certain point.

The method may include receiving location information of another location in which the mobile device is located, the location information is acquired by utilizing GPS based navigation; wherein the hand-held device reaches the other location after reaching the multiple locations; and updating the accuracy level of the location estimates of the multiple points based upon the estimated accuracy of the internal navigation system and a distance of each location from the other location.

The method may include receiving multiple multisensory data vectors and location estimates from another mobile device and updating an accuracy level to location estimates generated by the other mobile device based upon the location information acquired by the mobile device.

There may be provided a method for navigating in an indoor space, the method may include: acquiring by a mobile device global positioning system (GPS) location information; acquiring, after stopping acquiring GPS location information, a multisensory data vector and generating, by internal navigation system, a location estimate of a location in which the multisensory data vector was acquired; comparing the acquired multisensory data vector to at least one multisensory data vector of at least one grid point of a location fingerprinting map; determining a location of the mobile device based upon the comparison; and updating the internal navigation system with the location.

The multisensory data vector may include earth magnetic field readings and communication related electromagnetic signals; wherein the determining of the location may include calculating a location estimate of the mobile device based upon a comparison between communication related electromagnetic signals acquired by the mobile device and communication related electromagnetic signals of the at least one grid point of the location fingerprinting map; and updating the location estimate based upon a comparison between each magnetic field readings acquired by the mobile device and magnetic field readings of the at least one grid point of the location fingerprinting map.

There may be provided a computerized method for building a multisensory location map, the method may include: receiving, by an interface, multiple multisensory data vectors acquired by multiple mobile devices at multiple locations and location estimates indicative of the multiple locations; wherein at least a majority of the multiple locations are located within an area in which an accuracy of global positioning system (GPS) based navigation is below an allowable threshold; wherein the location estimates are at least partially obtained by processing accelerometers readings; and calculating, by a map calculator, in response to the multiple multisensory data vectors and the location estimates, a location fingerprinting map that may include multiple grid points, wherein each grid point may include a multisensory grid point fingerprint and grid point location information.

There may be provided a computerized method for building a multisensory location map, the method may include: receiving, by an interface, multiple multisensory data vectors acquired by multiple mobile devices at multiple locations and accelerometer readings obtained when a user moved between the multiple locations; wherein at least a majority of the multiple locations are located within an area in which an accuracy of global positioning system (GPS) based navigation is below an allowable threshold; estimating the position of the multiple locations by processing the accelerometers readings; and calculating, by a map calculator, in response to the multiple multisensory data vectors and the location estimates, a location fingerprinting map that may include multiple grid points, wherein each grid point may include a multisensory grid point fingerprint and grid point location information.

The method may include extracting, out of accelerometer readings, information relating to multiple walking phases; and processing accelerometer information relating to two walking phases to determine a direction of propagation of a user.

The method may include detecting maximal accelerometer readings related to first and third walking phases out of four walking phases; and determining the direction of propagation of the user in response to the maximal accelerometer readings.

The method may include detecting maximal accelerometer readings related to second and fourth walking phases and estimating the direction of propagation of the user in response to the maximal accelerometer readings related to each one of the first till fourth walking phases.

There may be provided a non-transitory computer readable medium that stores instructions for: receiving, by an interface, multiple multisensory data vectors acquired by multiple mobile devices at multiple locations and location estimates indicative of the multiple locations; wherein at least a majority of the multiple locations are located within an area in which an accuracy of global positioning system (GPS) based navigation is below an allowable threshold; wherein the location estimates are at least partially generated by internal navigation systems of the multiple mobile devices; and calculating, by a map calculator, in response to the multiple multisensory data vectors and the location estimates, a location fingerprinting map that may include multiple grid points, wherein each grid point may include a multisensory grid point fingerprint and grid point location information.

The calculating may include correlating, by the map calculator, the multiple multisensory data vectors and the location estimates, to provide the location fingerprinting map.

The non-transitory computer readable medium may store instructions for repetitively feeding to a mobile device that enters the area, location information for fixing location estimate generated by the internal navigation system of the mobile device.

The non-transitory computer readable medium may store instructions for updating an accuracy level of grid point location information in response to a number of mobile devices that acquired multisensory data vectors in proximity to the grid point.

The non-transitory computer readable medium may store instructions for updating an accuracy level of grid point location information in response to an acquisition of location specific electromagnetic signals acquired at a vicinity of the grid point.

The non-transitory computer readable medium may store instructions for updating an accuracy level of grid point location information in response to global positioning system (GPS) signals acquired in proximity to the grid point.

The non-transitory computer readable medium may store instructions for detecting indoor space singularity points and updating an accuracy level of grid points located in proximity to the singularity points.

The non-transitory computer readable medium may store instructions for building a map of the indoor space based upon the content of the location fingerprinting map.

The non-transitory computer readable medium may store instructions for sending to mobile device directional information in response to a location of the mobile device, a target destination and the location fingerprinting map.

The location fingerprinting map may be a three-dimensional map.

The non-transitory computer readable medium may store instructions for receiving multiple multisensory data vectors acquired by a mobile device at a plurality of indoor locations before receiving a multisensory data vector at a certain location in which the granularity of the GPS based navigation is below the threshold, and increasing an accuracy level of the location estimates of the plurality of indoor locations based upon GPS location information acquired at the certain location.

The non-transitory computer readable medium may store instructions for receiving multiple multisensory data vectors acquired by a mobile device at a plurality of indoor locations after receiving a multisensory data vector at a certain location in which the granularity of the GPS based navigation is below the threshold, and increasing an accuracy level of the location estimates of the plurality of indoor locations based upon GPS location information acquired at the certain location.

The multisensory data vector may include electromagnetic information.

The multisensory data vector may include at least one out of ambient noise, temperature, earth magnetic field information.

The multisensory data vector may include pedometer information.

The non-transitory computer readable medium may store instructions for repetitively estimating acceleration of a user and updating mobile phone coordinate system in response to the estimating.

The non-transitory computer readable medium may store instructions for repetitively estimating acceleration of a user and updating location estimate generated by the internal navigation system of the mobile device in response to the estimating.

There may be provided a non-transitory computer readable medium that stores instructions for: receiving location information of a certain location in which a mobile device is located, the location information is acquired by utilizing global positioning system (GPS) based navigation; receiving multiple multisensory data vectors acquired by the mobile device at multiple locations and location estimates indicative of the multiple locations; wherein the location estimates are generated by an internal navigation system of the mobile device; and associating an accuracy level to the location estimates based upon an estimated accuracy of the internal navigation system and a distance of each location from the certain location.

There may be provided a non-transitory computer readable medium that stores instructions for: acquiring by a mobile device global positioning system (GPS) location information; acquiring, after stopping acquiring GPS location information, a multisensory data vector and generating, by internal navigation system, a location estimate of a location in which the multisensory data vector was acquired; comparing the acquired multisensory data vector to at least one multisensory data vector of at least one grid point of a location fingerprinting map; determining a location of the mobile device based upon the comparison; and updating the internal navigation system with the location.

There may be provided a non-transitory computer readable medium that stores instructions for: receiving, by an interface, multiple multisensory data vectors acquired by multiple mobile devices at multiple locations and location estimates indicative of the multiple locations; wherein at least a majority of the multiple locations are located within an area in which an accuracy of global positioning system (GPS) based navigation is below an allowable threshold; wherein the location estimates are at least partially obtained by processing accelerometers readings; and calculating, by a map calculator, in response to the multiple multisensory data vectors and the location estimates, a location fingerprinting map that may include multiple grid points, wherein each grid point may include a multisensory grid point fingerprint and grid point location information.

There may be provided a non-transitory computer readable medium that stores instructions for: receiving, by an interface, multiple multisensory data vectors acquired by multiple mobile devices at multiple locations and accelerometer readings obtained when a user moved between the multiple locations; wherein at least a majority of the multiple locations are located within an area in which an accuracy of global positioning system (GPS) based navigation is below an allowable threshold; estimating the position of the multiple locations by processing the accelerometers readings; and calculating, by a map calculator, in response to the multiple multisensory data vectors and the location estimates, a location fingerprinting map that may include multiple grid points, wherein each grid point may include a multisensory grid point fingerprint and grid point location information.

The non-transitory computer readable medium, wherein the accuracy level decreases with an increase of a distance from the certain point.

The non-transitory computer readable medium may store instructions for receiving location information of another location in which the mobile device is located, the location information is acquired by utilizing GPS based navigation; wherein the hand-held device reaches the other location after reaching the multiple locations; and updating the accuracy level of the location estimates of the multiple points based upon the estimated accuracy of the internal navigation system and a distance of each location from the other location.

The non-transitory computer readable medium may store instructions for receiving multiple multisensory data vectors and location estimates from another mobile device and updating an accuracy level to location estimates generated by the other mobile device based upon the location information acquired by the mobile device.

The non-transitory computer readable medium, wherein the multisensory data vector comprises earth magnetic field readings and communication related electromagnetic signals; wherein the determining of the location comprises calculating a location estimate of the mobile device based upon a comparison between communication related electromagnetic signals acquired by the mobile device and communication related electromagnetic signals of the at least one grid point of the location fingerprinting map; and updating the location estimate based upon a comparison between each magnetic field readings acquired by the mobile device and magnetic field readings of the at least one grid point of the location fingerprinting map.

The non-transitory computer readable medium may store instructions for extracting, out of accelerometer readings, information relating to multiple walking phases; and processing accelerometer information relating to two walking phases to determine a direction of propagation of a user.

The non-transitory computer readable medium according to claim 33 that stores instructions for detecting maximal accelerometer readings related to first and third walking phases out of four walking phases; and determining the direction of propagation of the user in response to the maximal accelerometer readings.

The non-transitory computer readable medium may store instructions for detecting maximal accelerometer readings related to second and fourth walking phases and estimating the direction of propagation of the user in response to the maximal accelerometer readings related to each one of the first till fourth walking phases.

BRIEF DESCRIPTION OF THE INVENTION

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 19-21 illustrates accelerometer readings, different phases of walking of a person and an evaluation of a direction of propagation of a user according to various embodiments of the invention;

FIG. 29 illustrates a system according to an embodiment of the invention.

Figure 1:
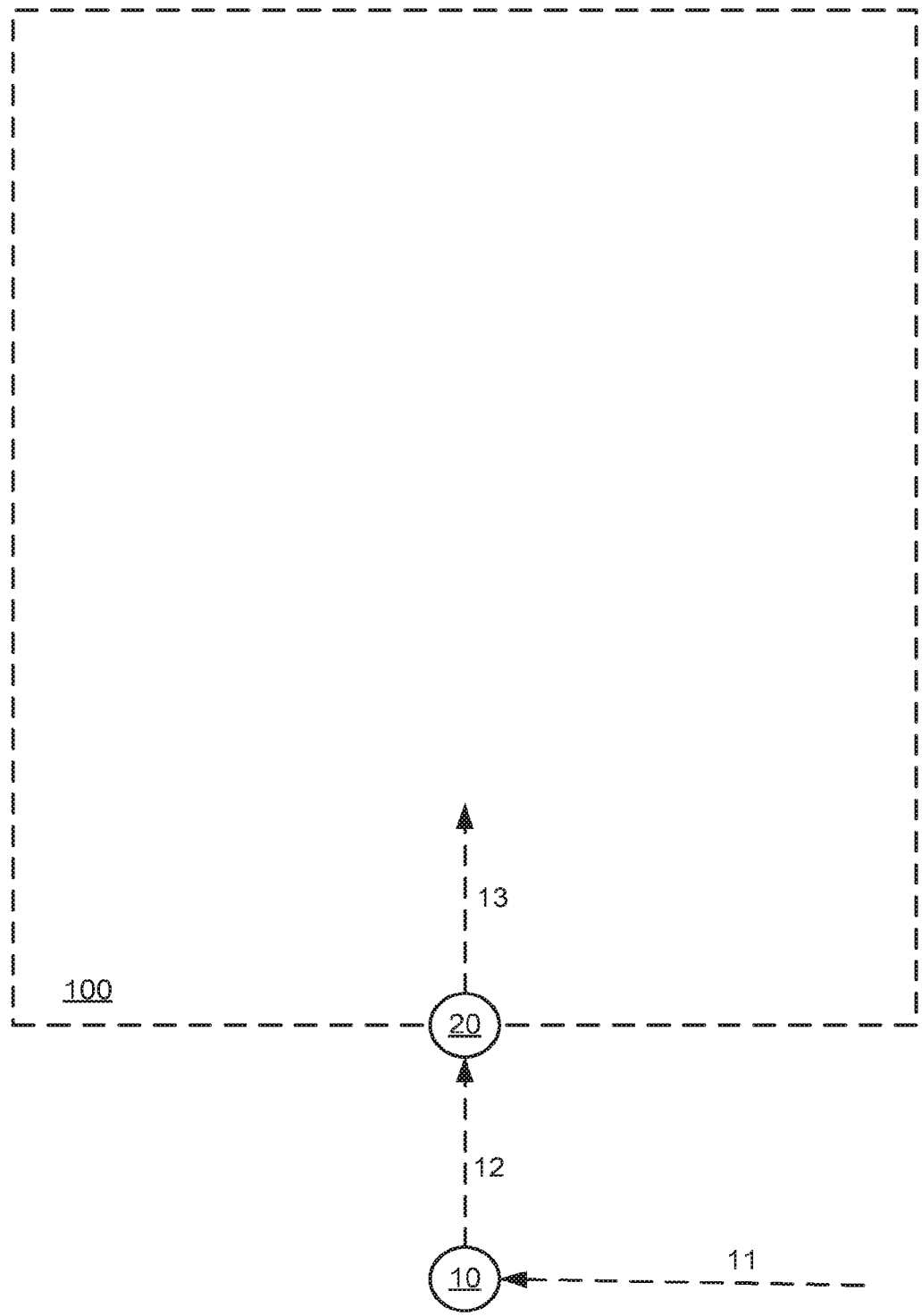
FIG. 1-12 illustrates an indoor space and multiple grid points according to various embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that can be executed by the system.

Any reference in the specification to a non-transitory computer readable medium should be applied mutatis mutandis to a system capable of executing the instructions stored in the non-transitory computer readable medium and should be applied mutatis mutandis to method that can be executed by a computer that reads the instructions stored in the non-transitory computer readable medium.

A system and a method for indoor micro positioning and indoor navigation using handheld devices and smartphones are hereby described. Modern smartphones are equipped with many sensors and sources of information. Accelerometers, gyroscopes and digital compasses enable inertial navigation.

Reception of various signals (e.g. GPS, Aided-GPS (AGPS), GSM, WLAN Access Points (WAP), BlueTooth (BT), InfraRed (IR), CDMA, 3G, 4G/LTE, NFC, Cellular, FM Radio, TV, Earth Magnetic Field Size and Direction, WiMax etc.) can be sampled to create location fingerprinting that are unique per each given position indoor or outdoor.

In recent years GPS is embedded in most smartphones and handheld devices. The advantage of outdoor positioning using the GPS is established and multiple useful commercial applications exist.

The System and Method may rely on Wi-Fi, GSM, AGPS and other Sensors Location Fingerprinting. Radio map or location fingerprinting map is a predefined infrastructure. It can be described as a grid of points that covers an indoor (or outdoor) space like a mall floor plan. Roughly every few meters (1 to 5) not necessarily aligned. For each grid point (a specific location) a measurement was performed and multiple sensor data was collected.

If for example an indoor area is covered with Grid Points (GP) every 1-5 meters, a comprehensive measurement per a point will include the vector (or group) of values of each and every received signal (e.g. WiFi, GPS/A-GPS, GSM etc.)

For every GP, such vector of up to dozens of values may include the unique identity of every received WAP (i.e. specific WAP MAC ADDRESS or physical address of the router) and WAP Received Signal Strength Indication (RSSI).

Currently not all mobile operating system incorporates access to hardware signals. Android based device enables that. As for IOS6 (iPhone's operating system), BlackBerry OS and WP7 (Windows Phone 8) and related devices the details will be clearer soon enabling application for as many mobile devices as possible.

Furthermore, the signal strength from as many as possible (up to 40) cellular towers, as part of the multisensory location fingerprinting data, are stored even if the reception is too weak for Cellular communication. Additional signals as may be available such as Television broadcast, GSM, CDMA, 3G, FM radio reception, WiMax and additional signals may be added.

Multisensory Location Fingerprinting

A multisensory location fingerprinting data (also referred to as Radio map) in the context of this described method and system, is not limited however to registering electromagnetic signals. Additional cues as microphone, ambient light, temperature, barometric pressure reading etc. are considered for diversifying the strength of every single grid point location typical signature, thus called location fingerprinting.

One key criterion for deciding whether or not to incorporate a signal (existing or futuristic) in the specific location signature is its location specific nature. Specific indoor location may be thus sketched with great details.

Creating location fingerprinting map involves huge, labor intensive effort in terms of resources, time and cost since calibration requires enormous number of measurements of full vectors of measurement results, along a minimal time for each grid point.

In addition calibration, once made is subject to timely updates and is not long lasting (additional access point, removed or shifted Bluetooth transmitter, new cellular tower etc.) making re calibration for many significant indoor areas impractical or commercial inacceptable.

The described system and method harness crowd of users to deploy and maintain such location fingerprinting anywhere.

Inertial Navigation Systems (INS)

Inertial navigation is an established method used in multiple platforms (e.g. aircrafts, ships, missiles etc.) for relative navigation. Inertial navigation loses accuracy over time. Main factors to dictate how fast inertial navigation will turn useless for indoor navigation include the quality and physical capabilities of the sensors. The main advantage of the inertial navigation system is its total independence.

The noisier the accelerometer, gyroscopes and compass (the compass is not mandatory for inertial navigation but exists in most current and future devices) the less time one can rely on pure inertial navigation only for positioning. In addition, small commercial accelerometers and gyroscopes that are embedded in handheld devices these days are not as accurate as those of an airplane or a ship.

Inertial navigation system can only measure the displacement of the device, in six degrees of freedom (3 degrees of freedom for position and 3 angles to dictate orientation) from its initial position and orientation as oppose to its absolute location. This makes the accuracy of inertial navigation tightly related to the accuracy of the initial position and the elapsed time since inertial measurements begun.

The trend of including accelerometer, gyroscopes and digital compasses to smartphones drives this niche electronic market to new peaks. Smaller, cheaper more capable inertial sensors appear with better accuracy and improved Signal to Noise Ratio (SNR). For the first time 9 degrees of freedom sensors are embedded in the iPhone 4, 4s, 5. Android based devices such as Samsung S2, S3 and Galaxy Nexus are coping with the new standard.

3D accelerometer enables the extraction of the displacement in 3 axes using double mathematical integration (acceleration to velocity change and velocity change to position displacement) and once added to original position the new position is computed. 3D gyroscopes sense the angular velocities of the device enabling the computation of device actual Pitch, Roll and Yaw as function of its initial orientation. 3D digital compasses measure the direction of the geomagnetic field. That enables the computation of the device's absolute orientation.

Each of the 3 sensor types can somehow compensate for the other sensors inherent disadvantages. The compass is relatively stable, but slow in reaction and susceptible to local interference (metal objects, local magnetic fields etc.) Its reading can be improved by the accelerometer and or gyroscope (that reacts faster but is noisier)

All these improvements in the modern mobile's inertial sensors, driven by strong and sustainable market need are subject to physical limitations. State of the art heavy and expensive inertial navigation systems (INS) are subject to drifts of hundreds of meters per hour as minimum. In case that no fix points are available to update or fuse into the INS it soon becomes useless for indoor navigation.

The described method and system uses periodical fix updates to renew mobile inertial navigation positioning.

Inertial Navigation System Fix Update

One method used for contributing to the inertial navigation accuracy is injection of positioning data from other sources. Modern high-end inertial navigation systems use the described methodology to improve inertial navigation over time. Positioning from another source (usually GPS for outdoors) is measured continuously and injected or fuses periodically to the inertial navigation system to fix it.

As absolute positioning from the GPS for instance is considered more accurate, system can still get the benefits of the inertial system (that can position and navigate without GPS) and use the fix points to eliminate the aggregated error. Thus, every few seconds the inertial navigation system gets a fresh start with accuracies that are good enough for positioning and has more time of good positioning estimation.

Eliminating the drifts of the inertial system by fix points from another source is an established way to get the most out of inertial navigation systems.

Dead Reckoning (DR) is Used to Improve Positioning

Dead Reckoning is equivalent in nature to the inertial navigation system approach. The process used to estimate the position of an object relative to an initial position, by calculating the current position from the estimated velocity, travel time and direction course. Modern inertial navigation systems depend on DR in many applications.

The described system and method uses built-in mobile accelerometers to detect human steps and identifies the step length based on biomechanical characteristic of the step. The type of step can depend on different factors such as gender, age, height and weight of the person. Measuring step size, step direction and counting identified steps can produce additional solution for how big the displacement is.

Map Matching

Map Matching is a method for merging data from signal positioning and a given digital map network to estimate the location of the mobile object that best matches the digital map. The reason that such techniques are necessary is that the location acquired from positioning techniques is subject to errors. Map matching is often helpful when the position is expected to be on a certain path, such as in the problem of tracking a moving vehicle on the route of GPS device. When indoor we can usually assume flat floors and straight hallways. This way we can eliminate (reduce to zero) erroneous readings from the inertial navigation system around Z axis and same for X, Y axes as well as angular accumulated errors (from gyroscopes or digital compass).

Please refer to Initial Use paragraph for further elaboration on the basic maps that are manually or semi automatically prepared or achieved via a collaboration with industry leaders in mapping indoors (Google, Microsoft and few startup companies) or with the indoor representatives (mall management etc.)

The described system and method can work with basic maps or no maps at all and yet produce enhanced indoor positioning and navigation in 'new' indoor areas since first use.

There are two forms of map matching algorithms: online and offline. The online map matching algorithm deals with situations in which only current and past data available to estimate the position indoor and improve positioning in new places that have not yet been surveyed by users. The offline map-matching algorithm is used when there is some or all future data is available (the recorded GP's) so the absolute position of the GP's is fine tuned to match more accurately the map.

The suggested system and method is unique in creating a cyclic process of improvement. Users get fair indoor accuracy using current positioning techniques, improved with described algorithms (including real time map matching, in case that basic map was made or given—which is NOT mandatory). They record grid point (location fingerprinting readouts of relevant onboard mobile sensors). The grid points serve other users (at later time) by enabling better positioning on the inner indoor parts (even before the grid is full), eliminating aggregated errors and creating better maps. Better maps use offline map matching to improve GP positions, and the cycle goes on bringing more accurate positioning and navigation and more accurate mapping infrastructure for the users.

Additional Built-in Positioning and Navigation Aids

While out of GPS sufficient reception (mainly indoor but not only), GPS may become inaccurate for positioning but is still valuable location fingerprinting collection. The indoor GPS signals, though weak, are stored in a raw format as part of the vector data for each location.

If for example we receive satellite ID and its signal, that signal and its metadata, while many times worthless for positioning will be part of every unique multisensory data vector that is measured by crowd of users, transmitted and stored in DB.

Even while out of GPS sufficient reception, few sensors can support positioning. Cellular reception is used and yields 60-300 m accuracy (based on Google Maps observations indoors and some literature). Our approach will take advantage of all the Cell towers in range of all available operators. We will not limit the algorithm in using only specific (or a subset) of Cell towers of the chosen operator or the strongest ones but all. In addition, pico cells and femto cells (small local cellular antennas) that are installed in small places to handle few cellular devices can enhance cellular location and produce unique location fingerprinting. Both effects will be taken advantage of to improve indoor positioning.

Detailed System and Method Description

The system and method described hereby are aimed at taking the advantage of the crowd to create an ongoing calibration process. Namely, people (or the crowd) that use the suggested application are walking (or driving) around and inside places of interest in which none or poor GPS reception exists thus contributing to the process.

In FIGS. 1-8 grid points GP1-5 are denoted 10, 20, 30, 40 and 50 respectively, dashed arrows 11, 12, 13, 14 and 15 illustrates the path between two consecutive grid points of grid points 10, 20, 30, 40 and 50 respectively. FIG. 5-8 also illustrate another grid point 10' and a path 12' traversed by another user (or by the same user) at later time. The indoor space is denoted 100.

FIG. 1 depicts an indoor area 100 without (or with insufficient) GPS reception for accurate positioning (the described system and method does use even residual GPS/AGPS reception as part of its location fingerprinting unique signature). A pedestrian (user) carries the mobile device while application is active. At this stage, no prior data is known (in the system database) about the internal floor plan, not even a basic map (floor plan). While outside he gets valid GPS reception used in conjunction with inertial, Cellular (GSM, CMDA, 3G and other standards) navigation. This reception fixes the system and eliminates all accumulated drift errors and creates an excellent baseline towards losing the GPS signal. While walking, Grid Points (GP) are recorded with multisensory data vectors that create unique location fingerprinting for each GP. GP1 10 and GP2 20 are recorded and sent over the web connection to the grid database on the remote server. Crossing the entrance (GP2 20), last GPS update (also referred to as Fix) lays good baseline for initial position for inertial navigation.

Figure 2:
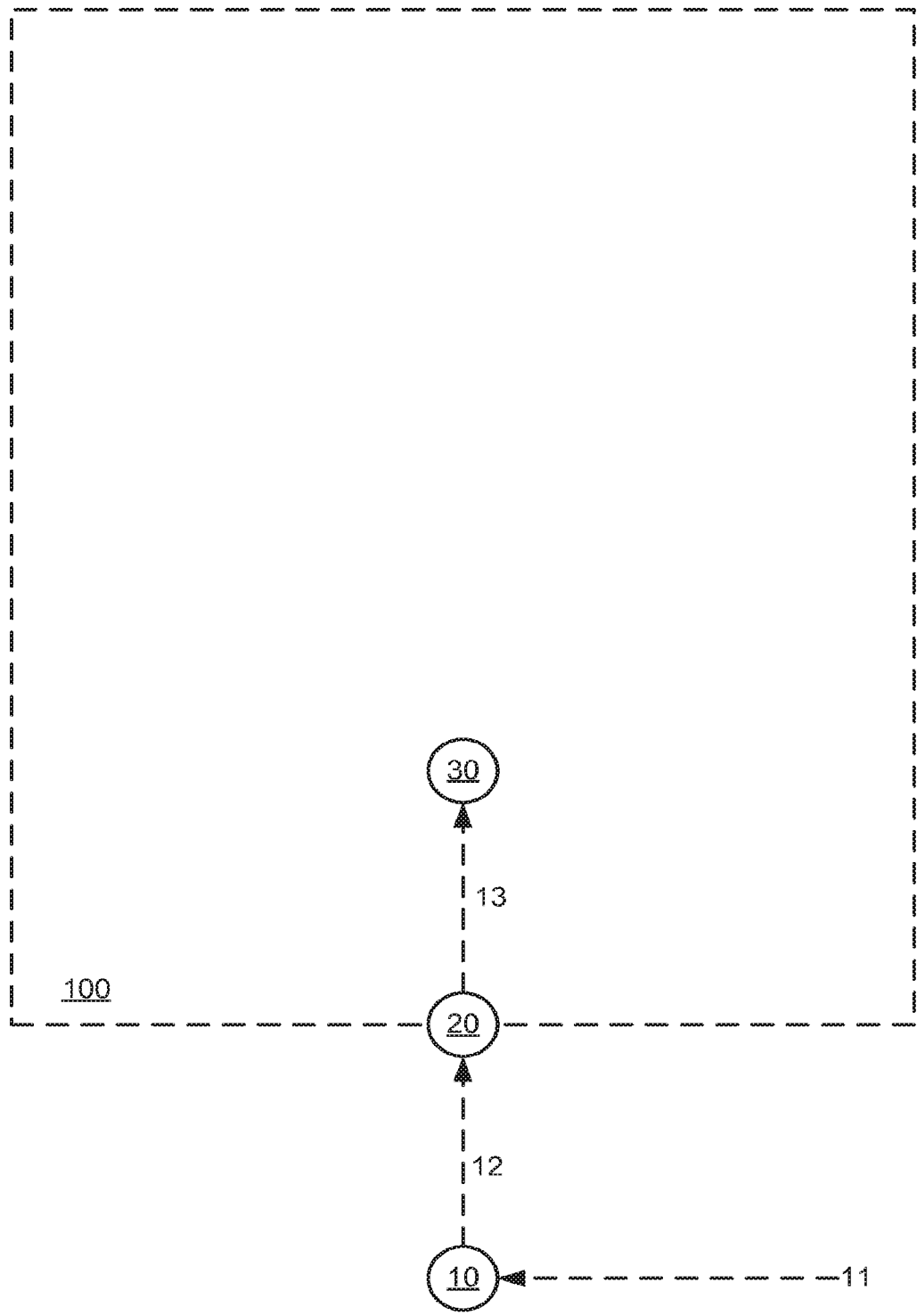

FIG. 2 depicts the record of GP3 30. That Grid Point 30 is new and it graded high (marked as small circle) for its absolute position based on the very good accuracy of the inertial navigation system at this stage (along arrow 13)—few seconds after the last GPS fix (the inertial navigation is totally independent and thus accurate and available indoor for short time) together with Cellular triangulation (and additional established multi operator and multi Cell towers based) are fused using standard prediction algorithms (such as Kalman Filter, Extended Kalman Filter, Reduced Particle Filter or equivalent statistical method) to maintain good accuracy.

Figure 3:
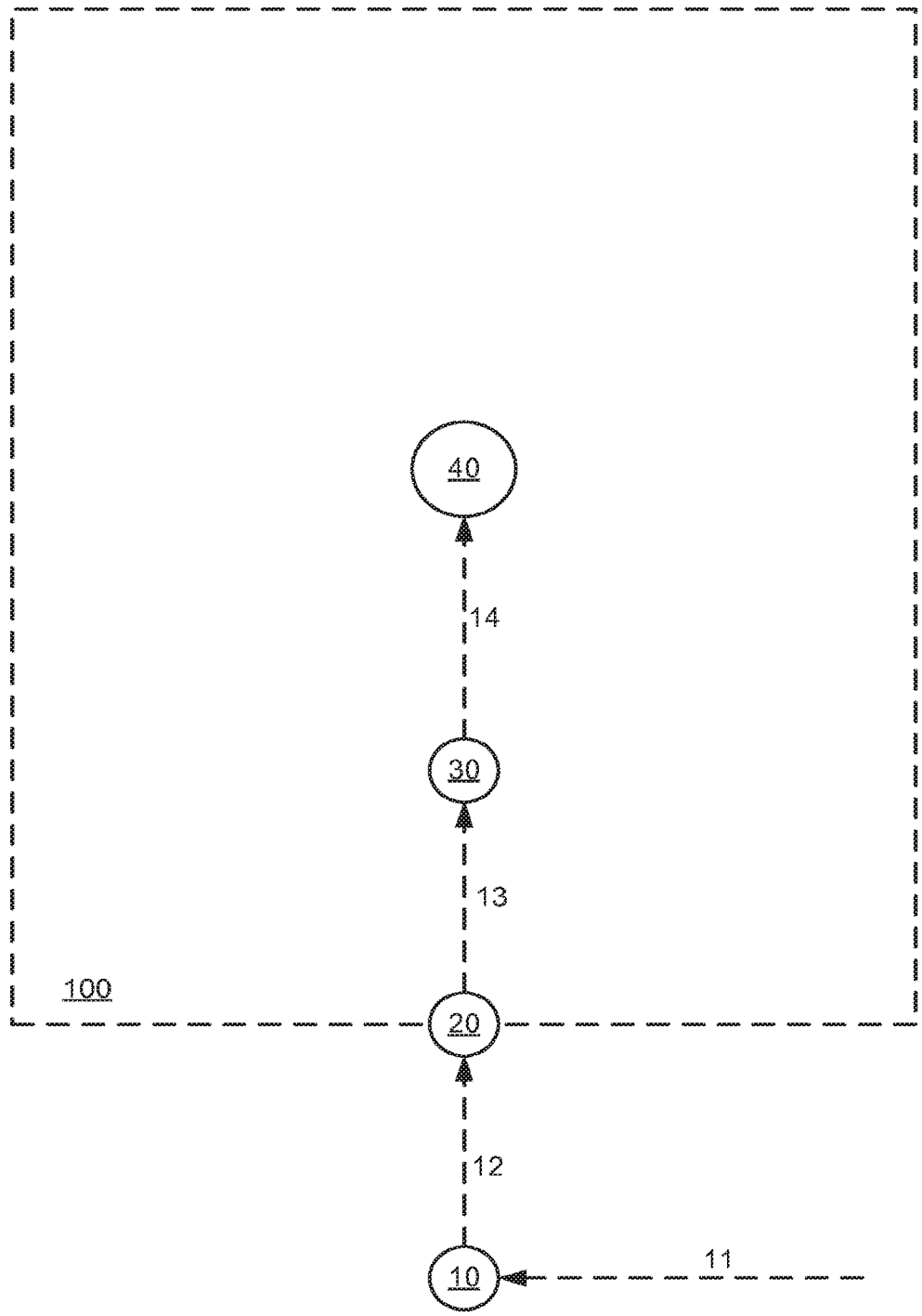

FIG. 3 depicts the growing drift (marked medium now—arrow 14) since last accurate fix point (at indoor area entrance GP2 20) so small differences and uncertainties are accumulated. GP4 40 thereby recorded fully (all relevant multi sensor location fingerprinting). The time interval between PG3 30 and GP4 40 represents a parameter that will vary from 1-5 meter. Producing higher resolution grid (with many adjacent grid points) will later support better positioning. The grade for GP4 40 at this stage is lower than GP3 30 because we know its absolute position but with less certainty and thus GP4 40 is marked as medium circle.

Figure 4:
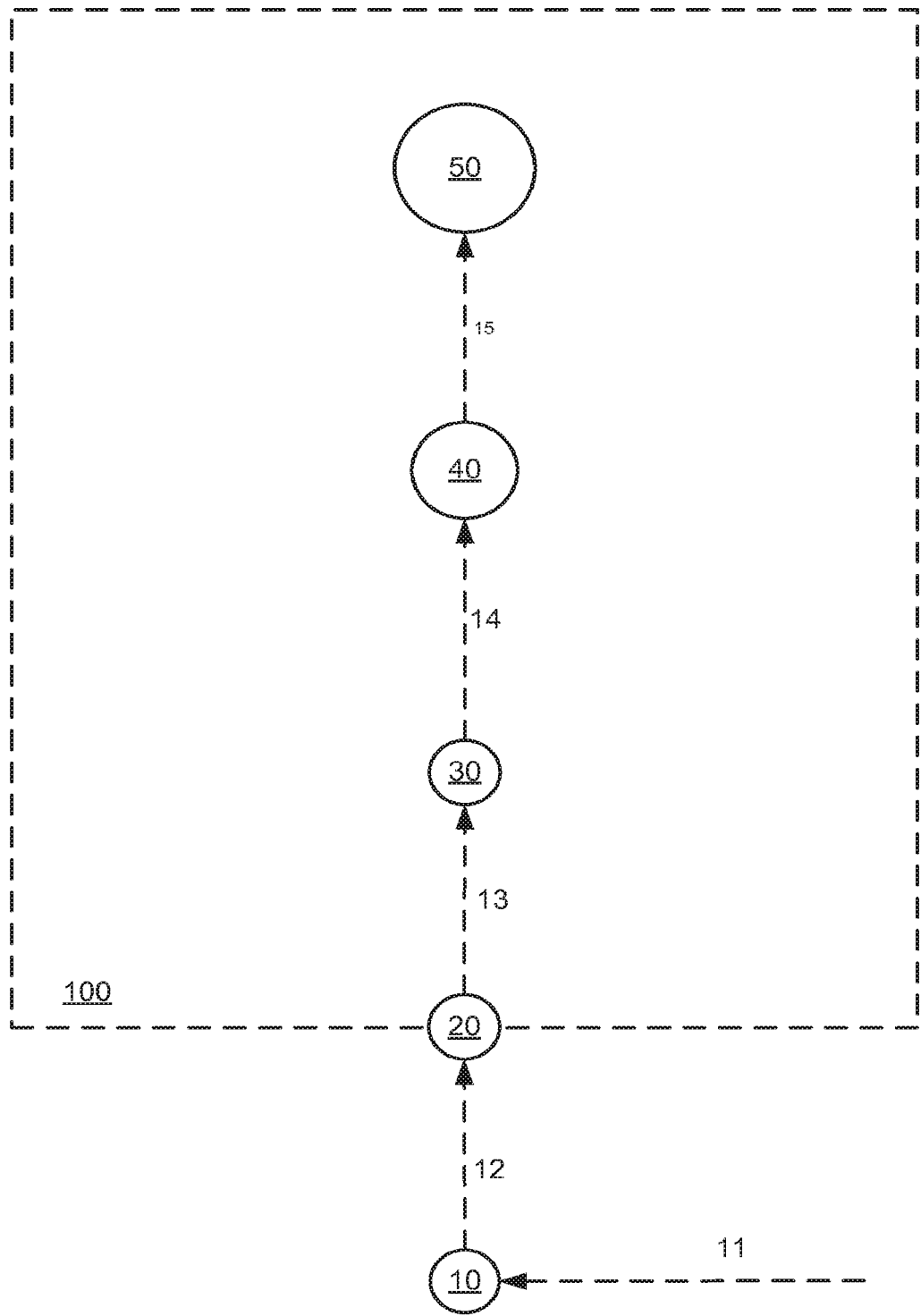

FIG. 4 depicts the man with mobile device moving further inside the indoor area. It is important to mention that the amount of points chosen to demonstrate the rate in which overall accuracy is reduced is just for simplicity and ease of presentation. It is possible that modern smartphones will have better inertial navigation performance, especially when aided with indoor Cell reception and positioning, dead reckoning and map matching algorithms. GP5 50 is created with relatively low grade (because drift along arrow 15 is high and is accordingly marked as big circle), a multi sensor fingerprinting data vector is recorded (like always when application is running) GPs in general are subject for ongoing improvement in their absolute location based on gathered data from crowd and updated measurement as for the data vector of their location fingerprinting. It is possible that at a certain stage the accuracy of the indoor positioning for the first user that entered the indoor area will drop under acceptable accuracy for good user experience in indoor positioning.

Figure 5:
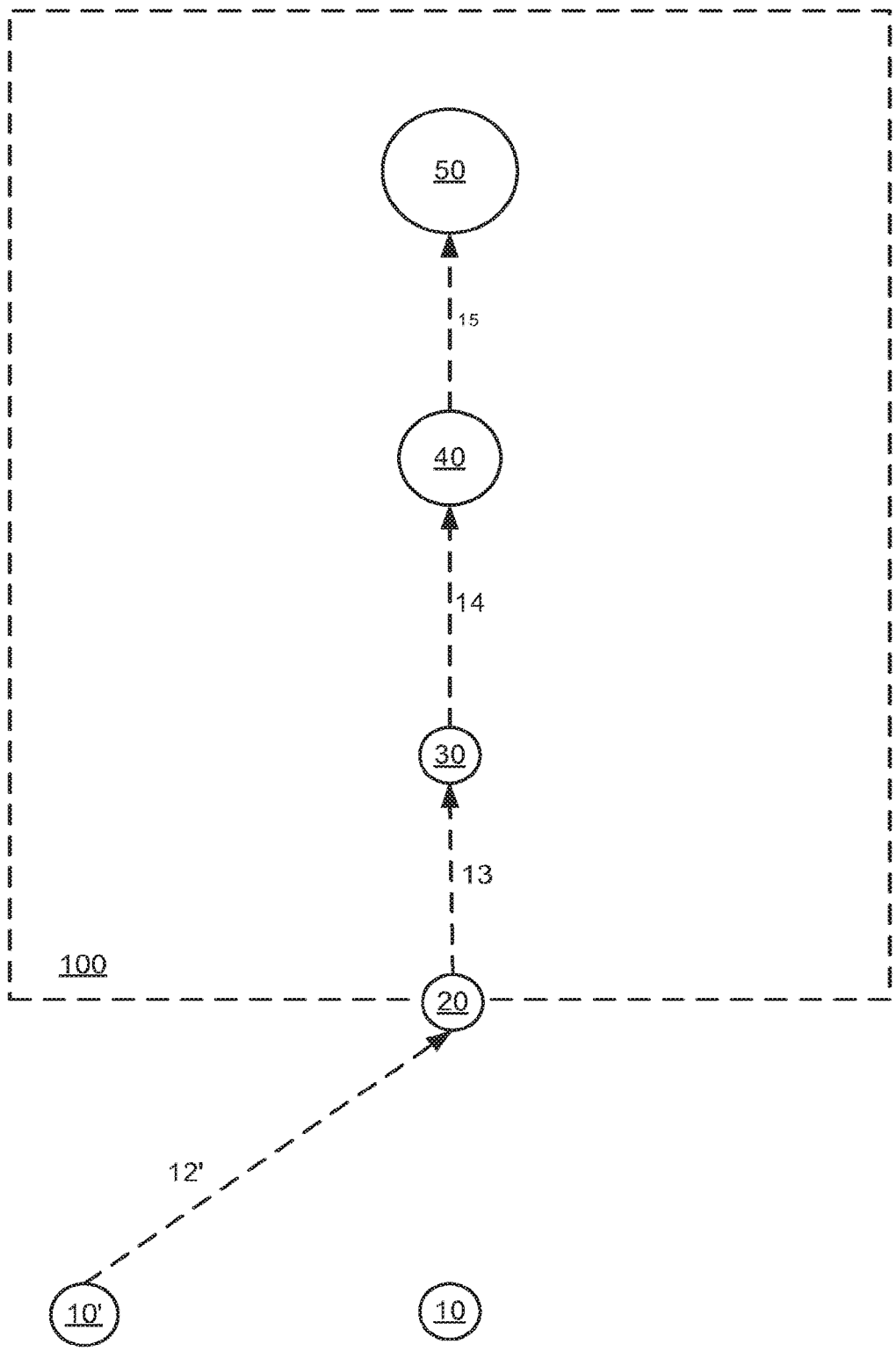

FIG. 5 depicts a second, another or the same individual walking inside that same indoor area at a later time. Please be aware that this presentation is simplified as people may enter and exit from multiple places thus contributing gradually to the rate, update, robustness and accuracy of the grid. This user is taking a different path when outdoor (contributing another GPS based GP marked 10' with full data recorded to the evolving database on the server side) but enter through the same entrance (near GP2 20). While walking inside, his device experiences minor drift near or along arrow 13. While nearby GP3 30 his mobile device records a point and compares its data vector against the existing GPs in real time. Please be aware that user relies for the first time on the GPs that were collected to improve his indoor accuracy in real time. Using statistical methods (given distribution function, typical changes over time and different mobile devices performance in reception quality as well as other factors) a fix occurs (We assumed here, again for simplicity, that he took a very similar indoor path but even if not, another valid point was collected near GP3 30). That fix eliminates all his device's inertial navigation accumulated errors.

Figure 6:
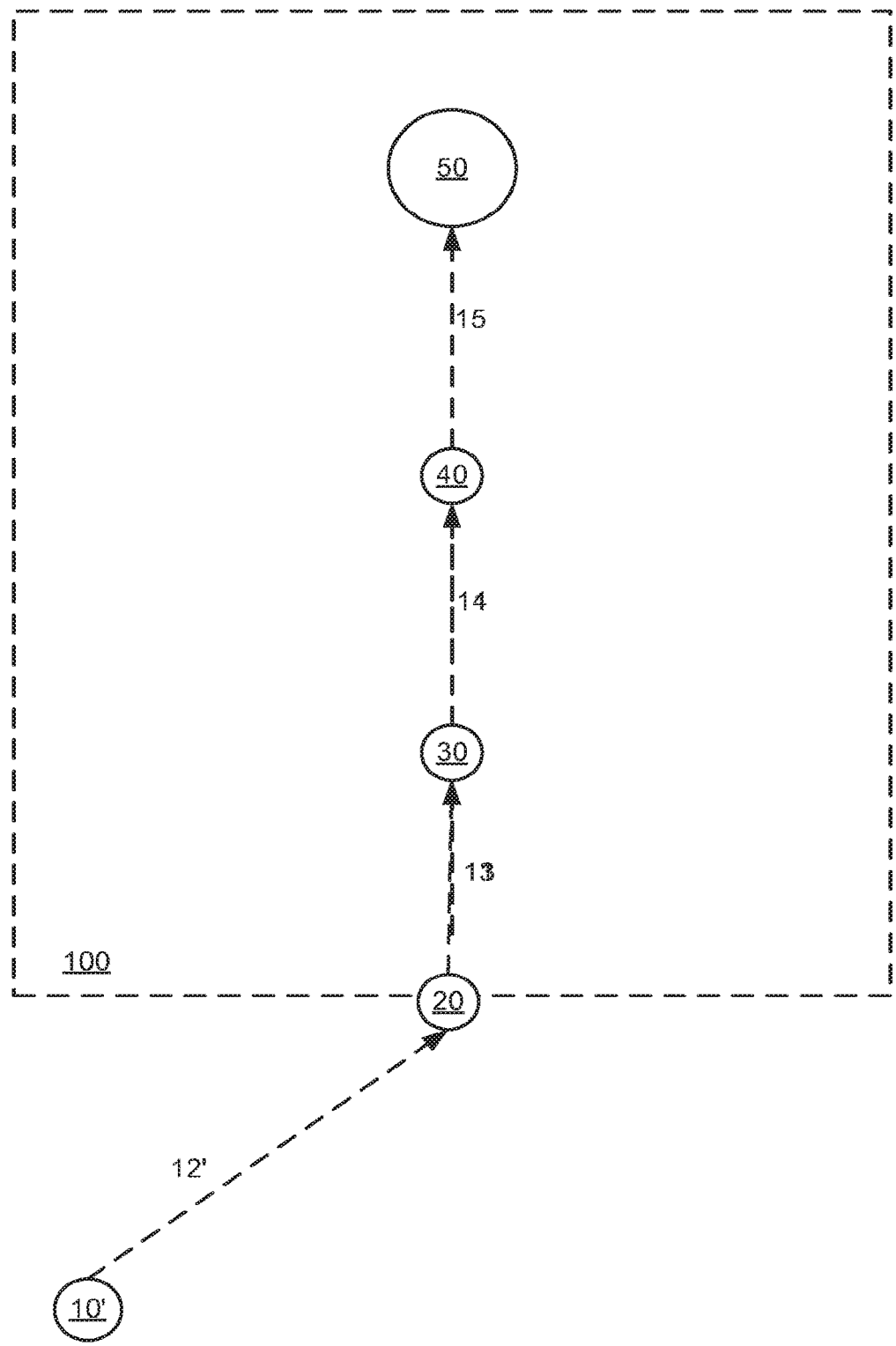

FIG. 6 depicts the user going further inside with minor drift (along or near arrow 14 as oppose to medium drift the first user had along arrow 14) again (like the first user had along arrow 13) and when compared against GP4 40 the grade of GP4 40 increases (now marked by small circle as oppose to medium circle before) since we now know its absolute position with better accuracy. In case that the user stopped for a few seconds (no steps monitored and velocity in x, y and z below minimal threshold logic) a longer sample is taken and such grid point accuracy rank for location fingerprinting measurement (as oppose for absolute accuracy) is increased. Longer static measurement produces valuable data as for the changes or fluctuations over time of the location fingerprinting vector data. Each GP has a grade for its absolute accuracy (based on the size that will be described in the following paragraphs) and a grade for the measurement length (given that user is static). Our analysis demonstrates that 20 seconds is good to upgrade or restore the location fingerprinting sampling grade to maximum. Longer measurement can also assist the algorithm in coping with the disappearance and reappearance of certain access points readings that may occur timely.

Figure 7:
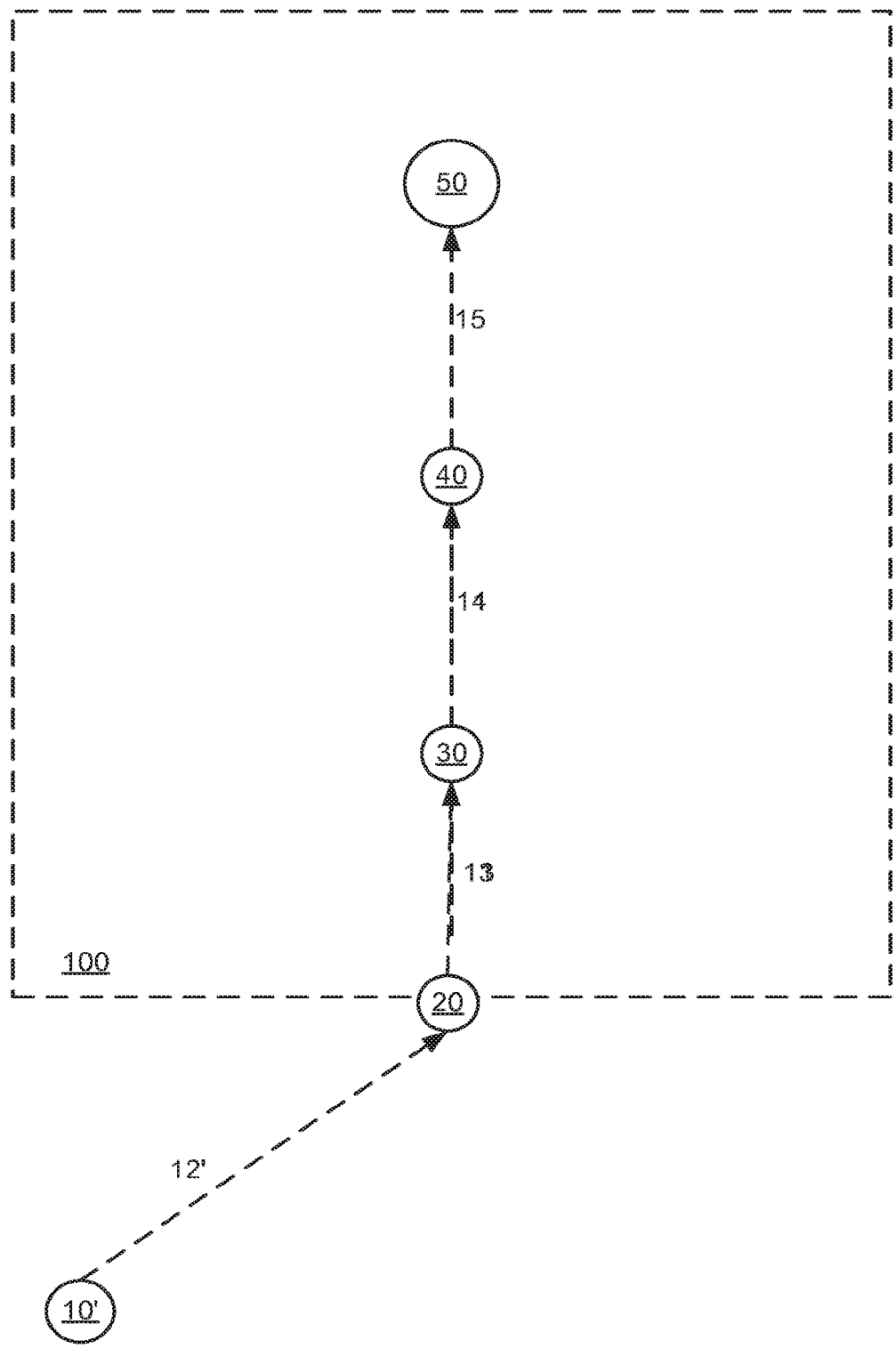

FIG. 7 depicts the same individual (again choosing very similar actual path for simplicity) moves further inside with only medium drift near or along arrow 15 (as opposed to high drift rate for the first user because he had no fix for longer time). Algorithm is than able to upgrade GP5 50 from low accuracy (big circle) to medium accuracy (medium circle). The size of the GPs is chosen to emphasize its grade in terms of its absolute location. Small is for accurate absolute location, high grade GP, medium represent mediocre uncertainty per GPs absolute location (as a result of more significant drift) and big represents bigger uncertainty and lower grade in terms of absolute position of the corresponding GP. Collected data include the mobile type (registered once and updated automatically as needed) to cope for differences in reception levels with different mobile devices.

Figure 8:
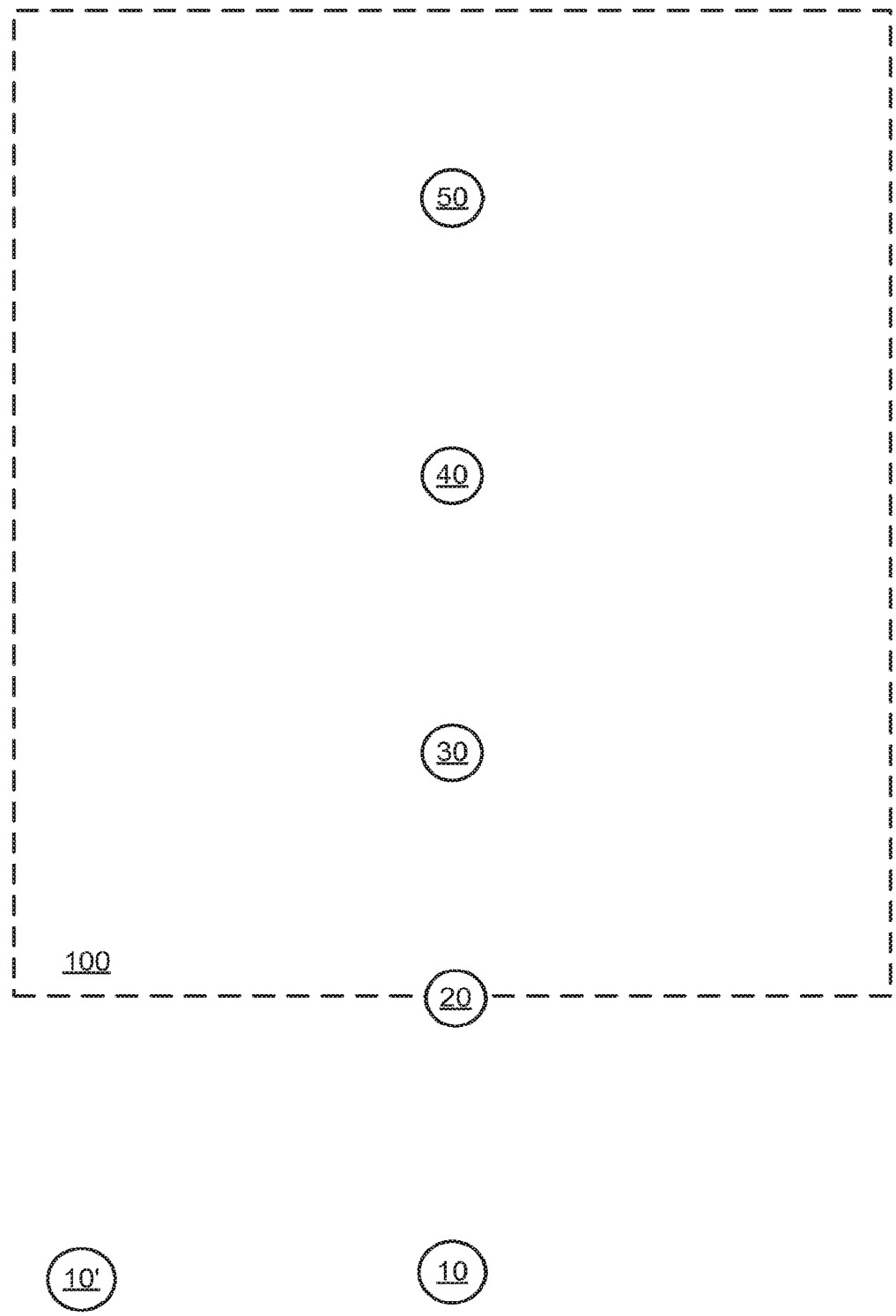

FIG. 8 depicts the grid after further improvement (GP5 50 is marked as small circle to represent high accuracy in its absolute position) after additional users with active application on their mobile device had surveyed the same indoor site (for example based on minor drift near or along arrow 15 as a result of fix near GP4 40). The ongoing Wi-Fi, Cellular (and additional multi sensor) location fingerprinting is crowd sourced. The process in turn enables better accuracies for indoor positioning.

Figure 9:
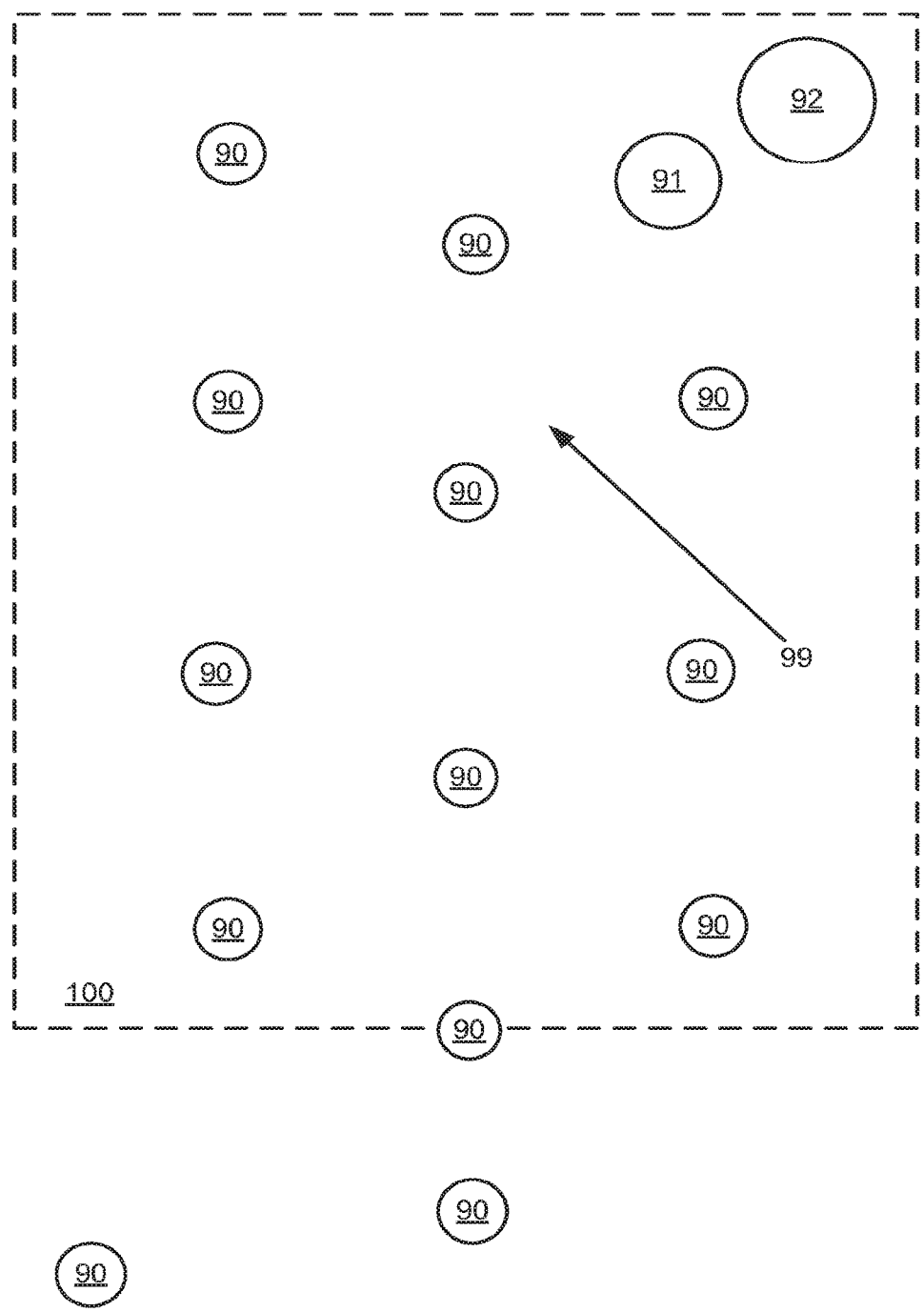
Figure 10:
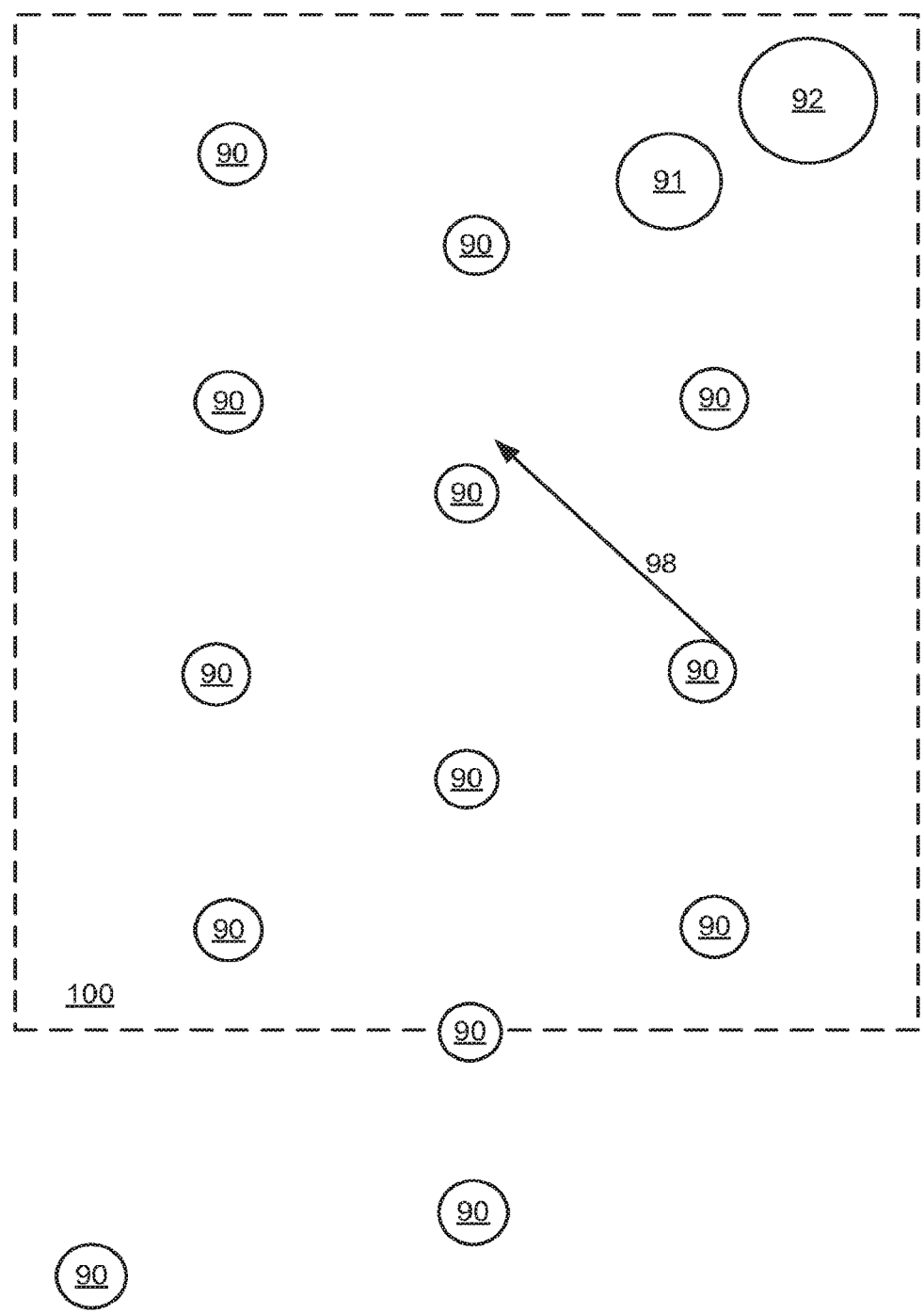
Figure 11:
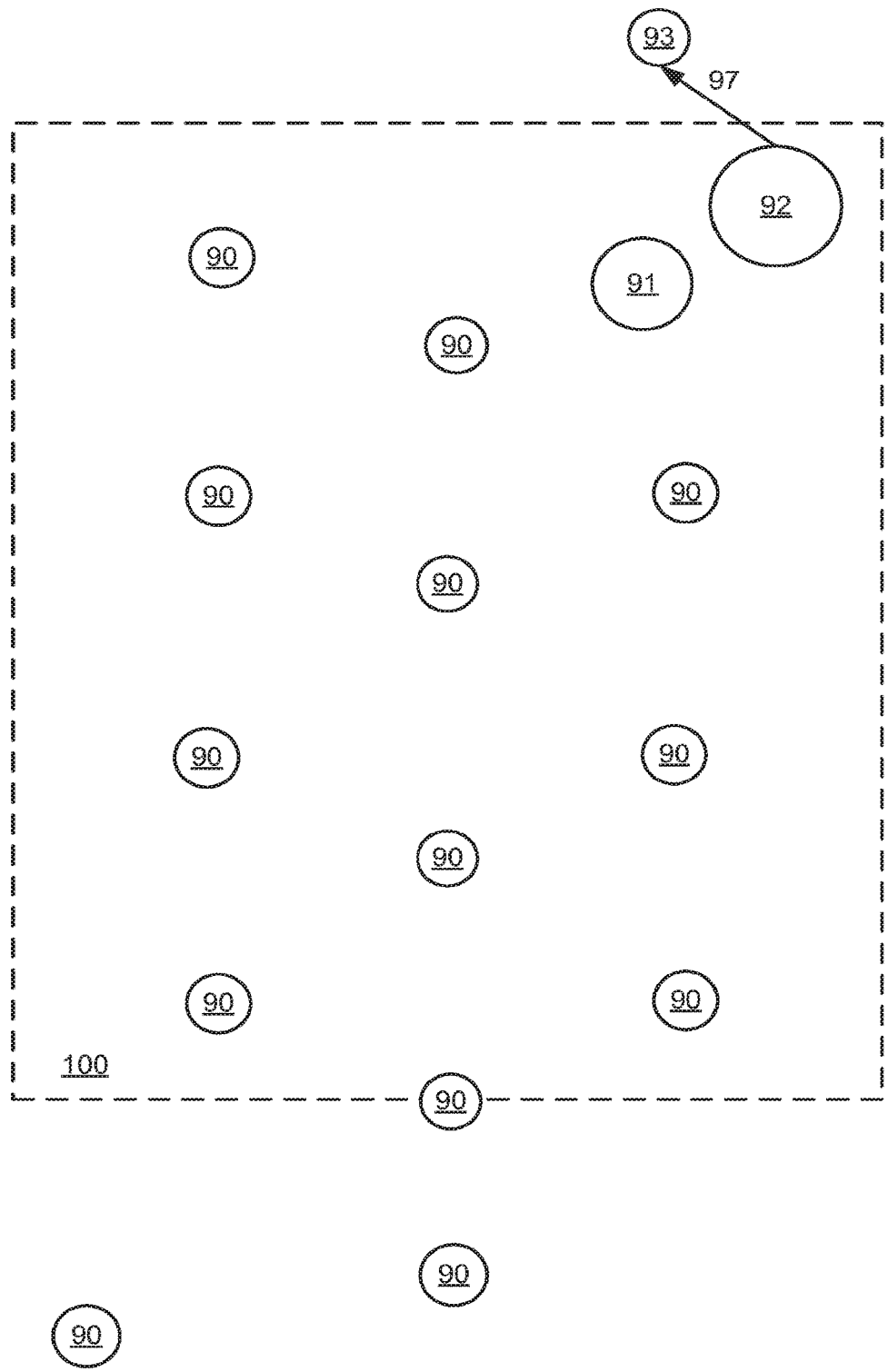

In FIGS. 9-11 multiple GPs are shown. Multiple grid points of high accuracy are denoted 90 and marked as small circles, medium accuracy grid point is denoted 91 and low accuracy grid point is denoted 92. These grid points are collected in different times possibly by different users. It is important to remember that many visitors walking different paths each from and to other stories, elevators, escalators, exits and entrances using different devices and measuring new GPs in different orientation (e.g. handheld, in pocket, in the car while parking indoor etc.) contribute to accelerate the formation of the crowd sourced multi sensor location based fingerprinting map.

In that case, a user (potentially a 'regular' user as oppose to early adaptor or mapper as described before) initiated his application while indoor having no initial GPS fix and arrow 99 illustrate an initial estimate of an initial path traversed by the user. Using best available Cell positioning and inertial displacement (together with DR—using step identification module) multisensory location fingerprinting vectors are recorded and compared against the existing location fingerprinting or grid database (that is managed on the server but is loaded dynamically to the device.)

FIG. 10 depicts a user fixing 98 his position indoor (made automatically) enabling him to initiate rather accurate indoor navigation (as one must know his own position in order to create a full real navigation solution). He then passes in vicinity to another GP and another fix to the corresponding closest GP will happen automatically. Although created by few users, that grid of multisensory location fingerprinting (also referred along this document to as Radio map) is imperfect. It can be seen by the existence of Medium and big GPs that mark accordingly lower grade and larger uncertainty for them in terms of their absolute location. That may occur dynamically if for example a new access point was added or a Cell tower was removed. Although not especially susceptible for such changes, due to wide base of multisensory data location fingerprinting collected, the algorithm may reduce the grade of a GP based on updated data (or missing data as described before). Please notice that if the individual that carries his mobile will make a random 90 degrees right turn, the algorithm will automatically upgrade the Medium GP 91 to a Small one (because a user with minor drift and very recent highly accurate fix is approaching it) and later the big GP 92 to an Medium one.

FIG. 11 depicts an established updated grid of multisensory location fingerprinting with a mobile device that is assumed to be near GP 92 that is marked as big circle for its low accuracy in terms of its absolute position. The current positioning in real time is mediocre and may even be insufficient for good user experience for indoor positioning and navigation. The user goes outside the indoor area 100 (arrow 97) to point 93. Point 93 may be measured for the first time but since it is outside area 100, GPS reception is regained and thus GP 93 with high accuracy is created. The indoor area 100 can be exited through an exit (it is unknown to the algorithm and irrelevant to define whether or not the exit is wide or narrow or the exit exact location at this stage).

Figure 12:
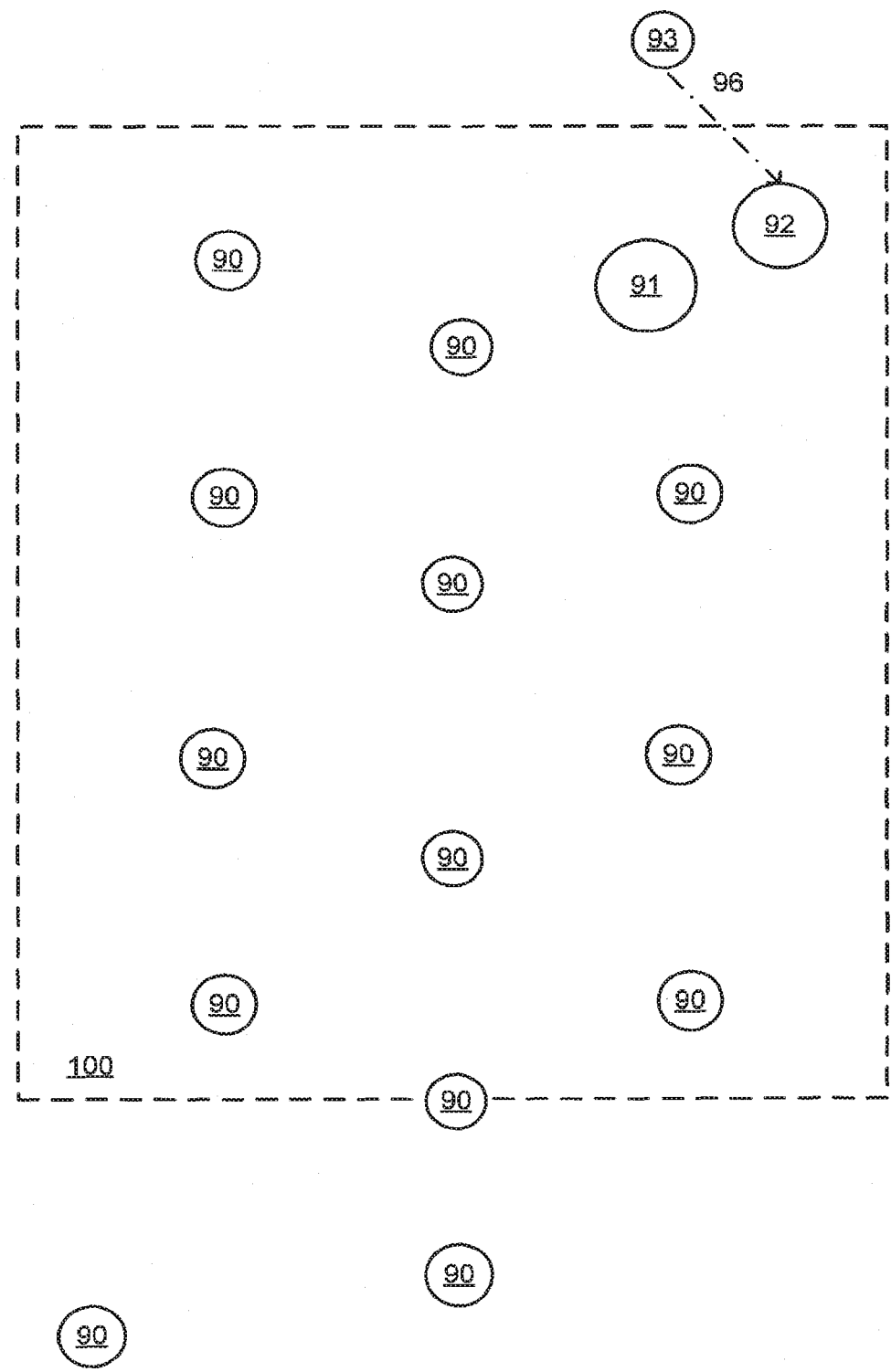

FIG. 12 depicts backtrack rank upgrade (dashed arrow 96) for the big GP 92 and due to its proximity to grid point 93 the accuracy of grid point 92 is now higher. That is done offline by the algorithm taking advantage of the rather accurate, non-GPS based estimation of the last few indoor legs or sections. For example, if magnetic North is up, we know (based on inertial navigation) that he was walking 23 meters in the direction 317 degrees from the big GP 92 to the Small GP 93 (GPS reception renewal and fix point) GP. Thus the grade of the last indoor point can become Medium or even Small (depending on the time and overall accuracy since previous indoor fix). Former GPs ranks can be upgraded in a similar manner based on the drift that is growing backwards when we look at it from the exit back to the indoor area. This way each unique GP rank can be upgraded (both forward in real time and backward and forward offline) and the grid is improved for the benefit of all current and future users. It is noted that the improvement is not limited to the direction or path of the last user or any user, as we know the offset between adjacent GPs. Once a GP was upgraded in terms of its absolute position, it may upgrade adjacent GPs accordingly by reducing their absolute position inaccuracies. Unique indoor points may refer to, but not limited to, Elevators, escalators, stairs, sudden GPS reception indoor or even a manual Mark made by the user. Mark means that the user interacts through the user interface to add a known point, like restroom position, business position etc. The algorithm is designed to send the user push notifications once defined that he is standing, leaving car (using on accelerometer-based steps identification module), entering Elevator, approaching exit, staircase etc.

It is noted that the method uses crowd collected location finger printings. The described system and method is not aimed at building a database of the actual or proximate base stations (a name for Cellular towers or Wi-Fi access points, Bluetooth routers etc.) absolute position, strength floor plan exact architecture, physical propagation etc. (also known as modeling or simulation approach) but rather to record wide data vectors for multiple sensors for each grid point. This method enables better indoor accuracy that is sufficient for getting to a room or a store, locate points of interest etc.

One main disadvantage of the modeling or simulation approach, namely collecting vast data in advance on base station absolute position, exact floor plan architecture etc. is the imperfect application of physical propagation model in complex indoor arenas. In addition, complex physical effects as multipath etc. makes simulation of signal strength difficult. That's in turn causes insufficient indoor positioning accuracies of 20 meters or more. To improve that a very detailed model (as opposed to a basic map or floor plan) of indoor walls, corners, 3D architecture, materials etc. is required making it less practical.

Continuous 'social' usage of the hereby described method and system and application on a critical mass of mobile devices will leverage their surveying to create a live, up to date multi sensor location fingerprinting infrastructure or grid points database.

The grid (also referred to here as Radio map or calibration grid) will gradually expand to cover (in a viral-like manner) more and more indoor spaces of interest. This grid will continuously improve indoor positioning supporting full 3D indoor navigation experience.

Collected paths will, in turn, be used to create and (refine existing) 3D maps of indoor places of interest. Accurate 3D maps will be published (in a controlled manner) for the benefit of all users. More and more indoor areas will enrich the database on daily basis.

All this can be achieved based on no prior data, no additional hardware, and no initial calibration. In addition, no complicated business models are required (like negotiating on mall-by-mall basis to get updated map, access points exact 3D positions, or cooperation in other issues). That in turn will support mapping of distinct and regular buildings and indoor areas around the world rapidly and efficiently.

Figure 13:
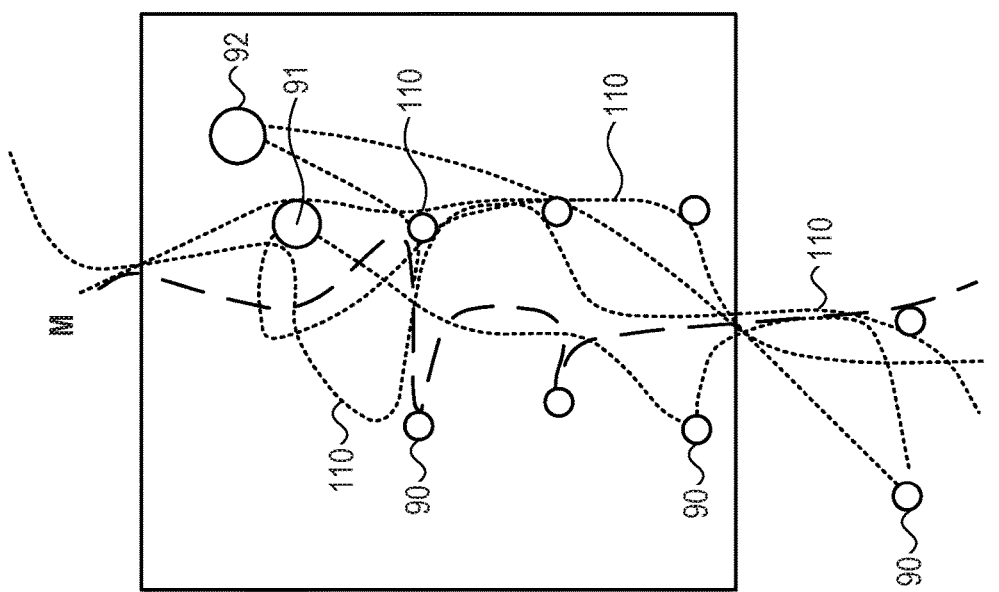

FIG. 13 depicts recorded collection of many possible paths 110 actually made by users over time. The system continuously record, every time interval (optimized also for extended battery life, mobile infrastructure Client Server bottlenecks and additional established design and system architecture criterion) the location fingerprinting, transmit it over the web and saves it for future use. In real time it matches the multisensory location unique data vector to the current adjacent GPs 90 thus enabling indoor positioning to the maximum available accuracy. The system also records anonymously and stores on the database all (or part of) users paths. Unified view of many actual paths that are based on enough reliable GPs 90 is a valuable infrastructure for itself and a powerful enabler for numerous applications. Even a simple layer of all recorded path on Google maps or Microsoft Bing Mall Maps (an initiative to map indoor areas for navigation but with no positioning solution) enables using automated or semi-automated tools for the production of skeleton map. As altitude is taken into consideration (for instance for identifying floor change, while on escalator) those maps are created in 3 dimensions. The direction in which stairs are approached supplies vital clue as for climbing or descending to the adjacent floor. Time in elevator with known velocity can contribute also for the floor identification.

Figure 14:
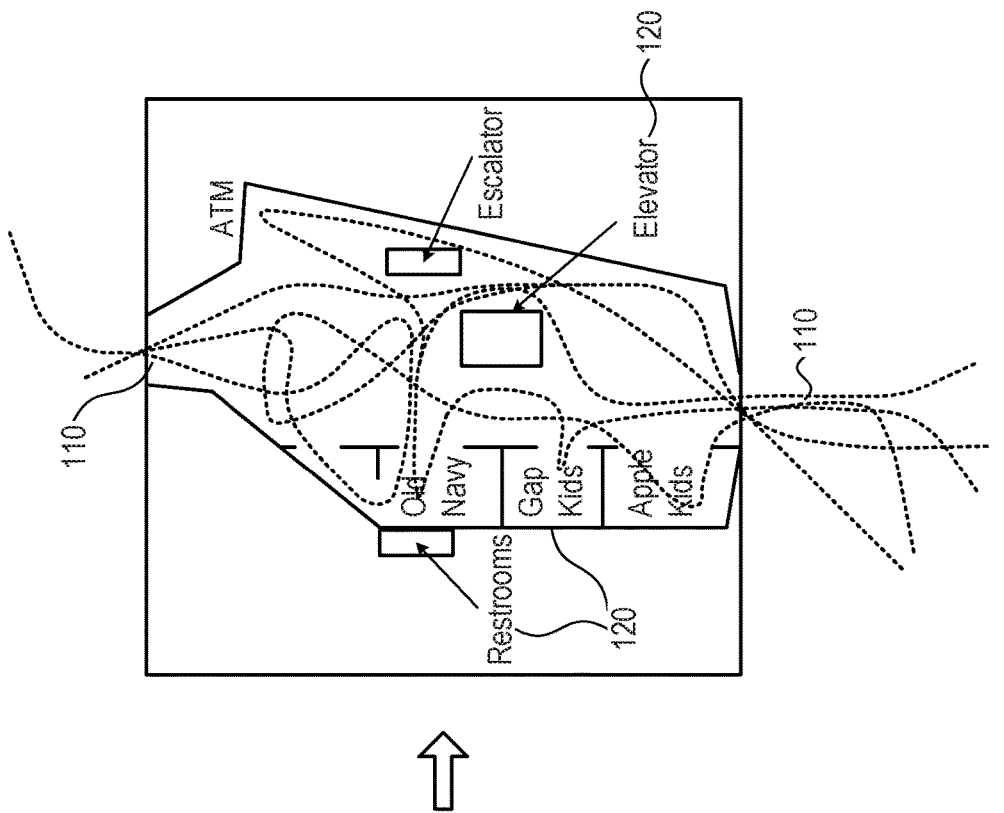
FIGS. 13-18 illustrates various screens shots that are displayed to a user of a mobile device a prior art read threshold voltage distribution.

FIG. 14 depicts linear lines (may be referred to as fences or hedges) around and not cutting in general the unified actual paths map. Users (whether visitors, business employees, business owners, campus students etc.) can Mark business 120 (and also rooms, stairs, hallways, gates, baggage claim, passport control, parking entrance etc.) via the mobile device interface and upload pictures of certain places indoor or out. That can be achieved by using commercial of the shelf tools for indoor design for places of interest. Algorithm may also seek for unique Wi-Fi names (e.g. "Gap Free Access") and cross that with existing databases about the place we are in (we easily know that using Cellular positioning). We can assume that floors are flat and hallways walls are straight for simplifying map production. Automated algorithm that identifies areas in which individuals were walking or driving while GPS reception is good, can mark these parts as open parking lot thus contributing to the accuracy and shape of the contour lines of the indoor space. In addition, based on applications like Google street view, Google maps 6.0 (that includes an initiative for indoor mapping) and Google Earth exits and entrances (from the street) to indoor areas can be identified and contribute unique points to enable tighter map matching around these points. Once produced, map can be duplicated to adjacent floors as baseline, subject of course to community members or back office updates and editions. Map creation is not limited to hallways and can map the inside of big stores likes Sears, Macy's, Nordstrom, Wal-Mart etc. of course no cooperation is required with the store to achieve that.

Figure 15:
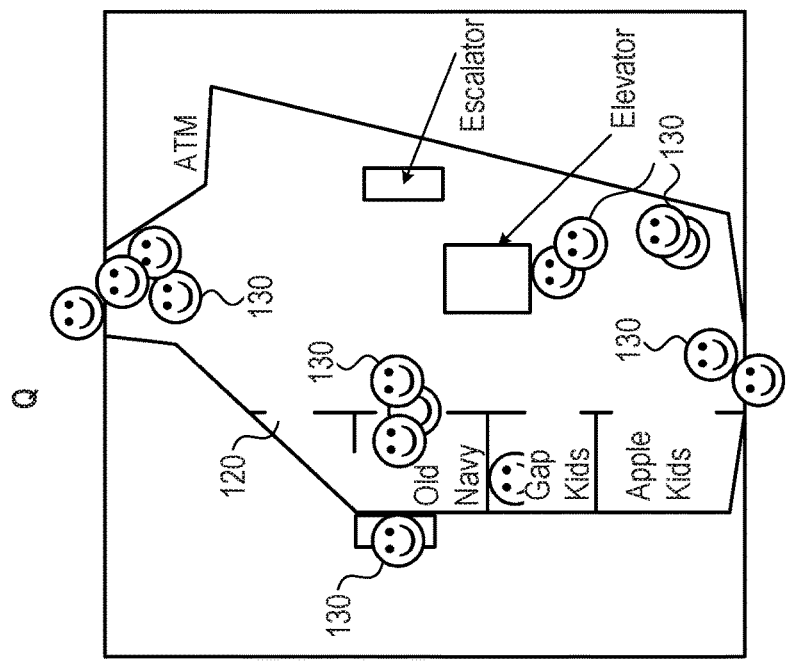

FIG. 15 depicts real time (or post action analysis primarily available for back office use and or premium users subject to all applicable limitations as for privacy issues). Community related info, tips, coupons, data etc. and any other location based pieces of information that are of commercial or social value to users are shared. Numerous applications can be based on the created infrastructure. The faces 130 mark the position in real time of friends and family that the user may want to find or locate indoor. Subject to the friends (taken from the users Facebook or equivalent account for example through simple UI) privacy settings they will appear on the device screen possibly via augmented reality (AR) interface.

Figure 16:
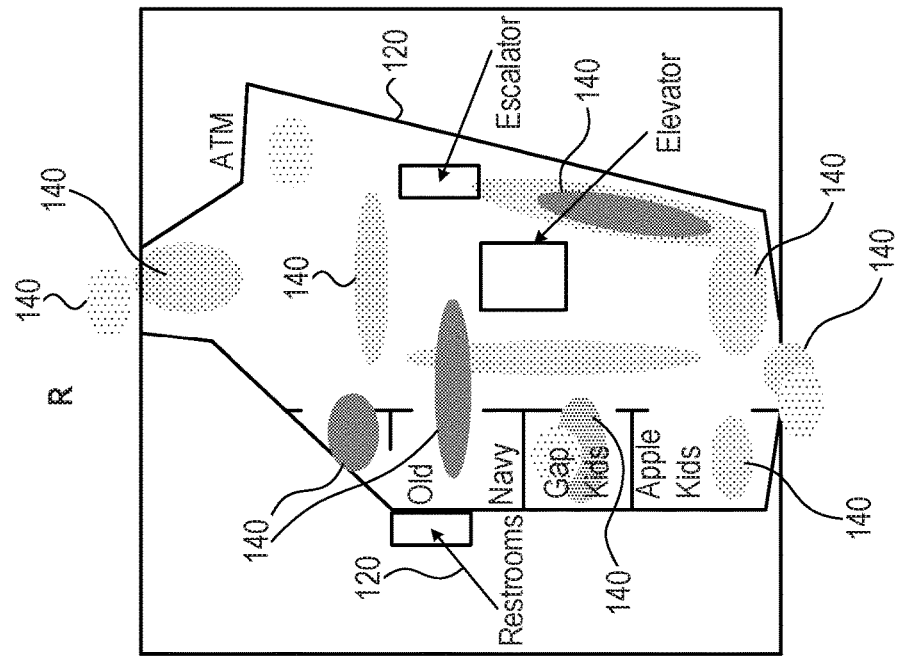

FIG. 16 depicts powerful business intelligence, consumer behavior and analytics tool. Real time heat map for additional what or where is 'hot' now? what is going on near me right now? sort of applications. It can be also of extreme value for retroactive analysis by different experts. The map of the floor 120 can be augmented by items 140 (for example of different color) that indicate the amount of traffic that passes through different locations of the floor per time. In addition, further analysis will reveal typical paths of users along the indoor venue, all subject to acceptable user privacy concerns.

The system and method described hereby starts from no prior data re indoor areas, leverage the crowd sourcing phenomena to defuse a grid or net of grid points (GP) from the outside towards the inner depth of railway stations, hotels, museums etc. while featuring acceptable user experience in terms of positioning accuracy (10-20 meters initially) upon first entry to a new building (that does not exist on the database yet) an infrastructure is deployed and getting improved. That in turn supports unprecedented (without additional hardware) accuracies of 5-7 meters (room level accuracy) or better for later (once critical mass of GPs are collected by active users surveying that indoor arena) indoor positioning and indoor navigation.

The created infrastructure will serve as a base for multiple very attractive commercial, local commerce, loyalty related, consumer satisfaction, customer service and social applications. Triggers for retail will enable deal-based coupon and shopper marketing at the actual point of sale or in vicinity to the aisle, shelf or product. Search of shops or products will enable income through sponsored links mechanism. The created database may be referred to as indoor positioning system (IPS) or indoor GPS is proprietary and thus may be commercialized to third parties as software development kit (SDK) or API.

Figure 17:
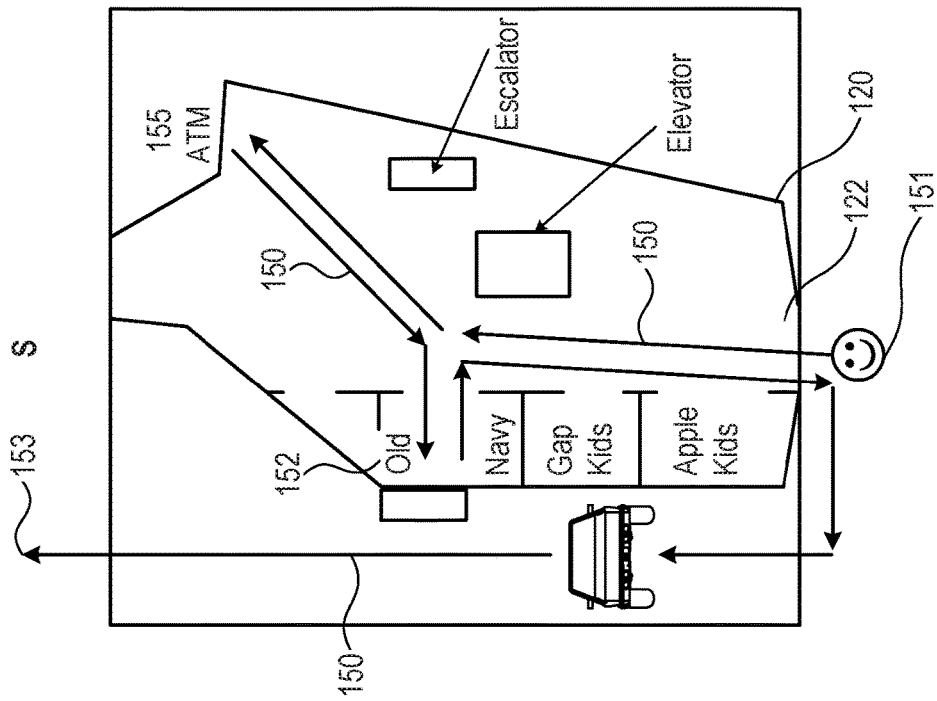

FIG. 17 depicts schematic view of the optimal path 150 for user 151 for drawing cash from nearest active ATM 155 (out of order ATM will be marked as inactive), buying something 152 (in a shop within opening hours as we know when that from the database when we get there) and getting back to the car in an indoor parking lot and driving away 153. Additional cool applications may combine Cellular wallet facilitating micro indoor positioning accuracies. Other applications may improve customer service and overall purchase experience. An example may be to call the attendant for help while in front of the shelf (assuming the sales representative too is an active user with the described application running on his web-enabled handheld mobile device.)

Figure 18:
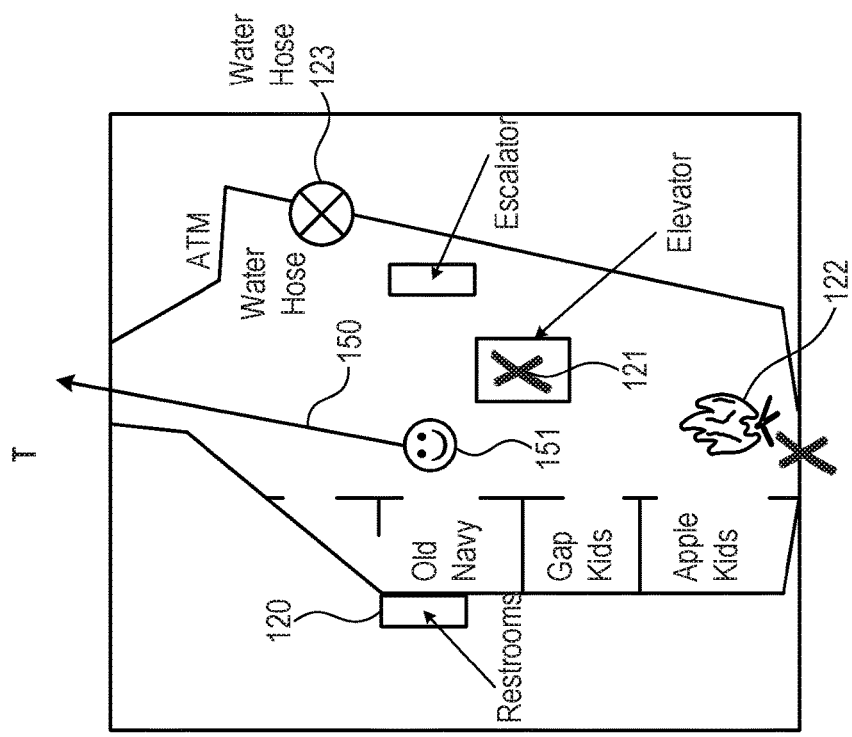

FIG. 18 depicts possible disaster management related scenario in which a report initiated by a user 15 (and probably controlled by central algorithm as for example for the number of different users reporting the same event at limited time frame and are actually in near vicinity etc.) Fire 122, fire extinguishers, water hose 123 and emergency exits (which were maybe marked in advance by municipal fire departments on a third-party application) and elevators 121 may appear or flash. Similar uses can guide visitors out of a hotel or museum, get them to an Airport gate on time based on their actual location or to a working (as oppose to malfunctioned one maybe) defibrillator for performing quick resuscitation in a patient. The application provides the best escape path 150.

Singular Indoor Points and their Contribution to Faster Grid Deployment

Singular points are narrow places that may be used as good fix points. Once the algorithm identifies that a user just exited to the street and got a GPS fix, his last inertial based collected grid points gets higher rank. The reason for that is that we now know exactly where he is, but we also know the exact 3D displacement for the last 10-60 seconds (depending on the grid points deployment and the time since last fix). Thus, we can 'go back' and increase, in reverse order, the grade (in terms of absolute indoor location) for the last grid points he collected. Same goes for entering an elevator, stating the escalator, or exiting the stairs peer.

This paragraph describes a method to faster deploy the grid point. It facilitates not only the entrance (which represents the last GPS signal). Many indoor places enable us to increase the grade of a collected grid point. It can be in real time, while moving forward and getting to a place near a wide window and suddenly get GPS reception indoor.

It can also work offline, when the algorithms identifies that the last collected grid points (by the individual that just stood by the window and got GPS reception and thus a very accurate fix) are more valuable than the poor grade they just got (because they were inaccurate due to too long time since last update) but they are upgraded from the GPS fix.

Required Accuracy

Indoor positioning of 5-7 meters or better is sufficient for good indoor positioning experience. On one hand 10-20 meters may lead to annoying misleading navigation commands, and sub-meter accuracy is not required (and most probably impossible with software only based solution) to get to restrooms, room, shop (even small one), exit, ATM, hotel room, car parking lot etc.

Leveraging Dynamic Base Stations to Improve Indoor Positioning

As robust collection of multisensory location fingerprinting involves wide range of existing and future sensors dynamic networks are considered too. Bluetooth devices and Wi-Fi hotspots exists on many handheld and modern smartphones. Part of the collected data vector will be allocated for networks that are mobile by nature.

Provisions of dynamic wireless communication base stations including Wireless LAN communication or comparable standards in vehicles are explored (also known as v2v for vehicle to vehicle wireless communication.) Trains and buses already equipped in few countries with Wi-Fi access points. Those dynamic inputs may be static for certain times (parking car or standing or sitting man with laptop) and improve robustness and accuracy to indoor positioning.

The described system and method utilizes such temporal dynamic Wi-Fi, Bluetooth and emerging base stations technology to improve location fingerprinting and indoor positioning.

In case that a user is in the same floor with another user at within wireless communication range, we can assume open space propagation model (as for the function that computes the decrease in signal per distance) and triangulate one or more to enhance positioning. We can assume open space based on the floor plan when given. We know that distinct users are in close vicinity by directly comparing their vectors of location fingerprinting (taking into consideration the known differences in devices hardware e.g. antenna strength etc.) that is powerful because we do not necessarily have to know where they are exactly but know that they are close, static, moving together (continuous location fingerprinting similarity) or not. Such co-movement or temporal huddling can serve for many applications that are related to events, dating, business situations, shopping preferences etc.

If for example a man stands outside the mall with fair PGS reception and another user sits in a Coffee place indoor, they can both contribute significantly to the position accuracy in real time of a third user within reception range from both. This improvement may prove beneficial mostly for ad-hoc cases, but as many users are indoor, it may contribute to the position and fasten the structure process or (a diffusion-like process as described) of grid points sampling (with multi-sensory data) and validation. If we know (for example from the floor plan) that there is an open space from the man in the coffee (indoor well positioned) to the third user (indoor but with mediocre positioning solution) and between the man outside (with GPS reception and excellent positioning) and the third user, we can significantly improve third user positioning.

System Architecture Considerations

The described system and method is designed as a client server distributed architecture. Databases of grid points and maps are stored in the server. Server side involves described algorithm and some COTS map editing tools. Dynamic subset of Databases of grid points may be pushed automatically in real time to users devices so that relevant user proximity can be analyzed and compared also locally on the device.

Mobile device's UI, hardware, computational and graphical capabilities and limitations are taken into consideration to optimize overall performance for responsiveness and good user experience and overall optimization.

Key considerations deals with power management to ensure longer battery life, memory limitations, CPU bottlenecks and clever Bandwidth management enabling dynamic upload and download of required data to and from the mobile device.

Backup Modes

Once positioning accuracies drops under certain threshold a backup mode is initiated. Then the application may ask for current position and aid in navigation by finding the fastest, shortest path to the required destination. That is decided automatically based on accuracy and may be easy for user to feed in as in malls, airports etc. own place is easy to know from nearby signs, shop names etc.

If internet connection is lost periodically, positioning and navigation is still available in the following manner. Adjacent grid points are preloaded to the mobile handheld with more points in the current direction of movement (and less behind) so localization by comparing current measured multisensory data against nearby points can be done even with intermittent internet connection.

In addition a buffer on the device keep recording the sensor data to create and re measure grid points. While reconnected to the web, data is transferred from buffer to the server database.

No Additional Hardware Required

The described method and system requires no additional software or hardware for deployment and implementation. Adding hardware in order to enable indoor positioning and indoor navigation is a major disadvantage for all other indoor positioning and navigation approaches that consists of additional hardware.

Approaches that requires additional elements (e.g. unique chips to the device or special modifications or additional transmitters, routers, WAPs, receivers, sensors etc. to the indoor arena) Even minor changes or infrastructure installments like Infrared emitters, RFID sensors or Pseudolite (for indoor GPS like reception effect) require, when applied to significant indoor areas, huge expanses on production, installation, integration and maintenance Built-in device chips that will enable indoor navigation may be added in future smartphones. We know that penetration rate of new high-end smartphones is slow and so robust indoor positioning solution that is based on additional HW to devices will suffer from slow deployment as well.

In addition not all places of interest for public positioning and navigation are of sufficient commercial value for justifying the related effort of predefined location fingerprinting.

Mandatory Elements

A real indoor navigation system should consist as a minimum on positioning that enables the above-mentioned accuracy, efficient routing for navigation (Dijkstra algorithm based or comparable that is based on a graph representation of the simplified map), DB and UI.

User Interface

One key factor is the user experience. A light, 3D/2D interface will be fitted. Definitions will control auto adjustment to ambient light for day/night representation. A clear marking of present position with uncertainty circle bleeping overlaid on indoor space map. Destination will be available for choosing easily from a database. Display filters will enable showing places of interest by category (e.g. food, shoes, fashion etc.)

Unique places like restrooms, stairs, escalators, elevators, entrances, exits and emergency exits will be clearly marked. For special algorithmic usage for the unique indoor points, please refer to Singular Indoor Points.

Initial Use and Early Adopters Incentive Principals

One challenge is to draw users to download and use the application before we have sufficient infrastructure (multi-sensory location fingerprinting). In that phase places with huge traffic or interest will be mapped manually. Mapping process is quick and simple using available sketch and design tools. A store or a room is marked as a node (junction in a graph) and hallways, exits, entrances (to both indoor areas and to stores) are also marked.

In addition, facilitating the inertial navigation approach, with fix points combined with Cellular based navigation will result reasonable positioning of better than 20 meters indoor even before calibration started. As competition arise and suggest comparable solutions in terms of accuracy (based on better algorithms or improved hardware) the described solution also gets better. Yet the killer application is the 'quiet' progressive deployment of the crowd sourced multisensory micro location fingerprinting grid.

Encouraging early adopters to download and install the application may involve mileage kind of benefit. Virtual goods or Pay Pal payments can be made and badges can be given to those who use it most for mapping the indoor areas of interest for the benefit of future users.

Similar incentives can imply to whoever update a mark a business, mark another point of interest, perhaps as a reaction to a pop up that asks him to do so as deemed needed automatically by the algorithm, do a special pattern indoor (e.g. going from the entrance to the nearest exit or nearest unique point such as elevator etc. may boost the grid deployment) or uploads indoor pictures.

Enabling feedbacks on a certain business for the benefit of the close by users can be done and may be limited to users that are in the proximity of the business while reporting thus limiting unfair commercial bias or spamming.

Other incentives may include sub communities or groups that can share tips or other information between the group members.

One fundamental advantage is the scalability of the described system and method. It can work starting immediately based on current handheld devices and current infrastructure. The more chips, sensors, base stations, transmission methods etc. that are added to the indoor area, the mobile device or both give advantage to that method as well as for all others.

Yet the underlying idea that lies beneath it gives a major advantage. The more users find it beneficial and adopt it as their indoor positioning and indoor navigation of choice (leveraging hopefully the first mover's advantage) the faster the grid is deployed.

Since grid points accumulated are proprietary it acts like a 2 stages program. Loyal user will see great improvement with no additional hardware whatsoever. Once regular buildings in peripheral area are surveyed the grid is built and the positioning accuracies move to the next level.

There might be a big public interest for example round enabling faster, safer approach for blind people (or otherwise handicapped) to some sort of forgotten government complex in a negligent town. That may draw additional users.

Classical Use Cases

One preferred mode of action involves launching the application by the user while driving outdoor, few miles from the indoor area of interest. One very frustrating aspect in working with current outdoor GPS based applications is that they take you to the address on time, but then you are left alone looking for parking (underground in many cases) and need more time to find your way to a specific room or shop (baggage claim, gate etc.).

Such 'holistic' approach (namely using as many as possible RF together with device's multisensory data for enabling indoor positioning and navigation) to positioning can overcome these problems. As indoor parking is mapped (to the extent they can be somehow sampled via the multisensory location fingerprinting described system and method) indoor positioning and navigation there will be enabled using the system.

A community member (application user) that just leaves his parking (if he stopped stepping, and start moving faster than 10 km per hour or connected the charger for example he is probably driving) may produce an automated push notification to the one that seeks for parking lot etc.

A user can scan a barcode from a highway advertisement sign and be led to the mall parking and walked turn-by-turn to the store indoor. He can also get a notification when he is about to be late for his next Calendar event based on real time accurate estimation of the time it takes to walk to his car (busy elevators can be excluded from optimal planned path and restroom visit may be included) can be considered together with traffic at the underground parking etc.

As generally grid is built (and grid points are added) automatically from the out inbound, indoor positioning for all users become more accurate and hit the required accuracy level of better than 5-7 meters. This level of accuracy is achievable by methods of location fingerprinting (Wi-Fi and Cell).

Such positioning creates unprecedented indoor navigation experience. Even future accelerometers and gyroscopes alone (pure inertial navigation) will not enable that level of indoor accuracy unless hardware is added or periodical calibration is performed. Such positioning also record accurate walking paths in real time. That feature is unique and enables, among other uses, valuable analytics on consumer behavior Business Model While surveying the indoor space, application maintains on line and connected to the web. The connection is standard (Wi-Fi, WAP, Cellular internet or equivalent) to support collecting the measured grid points and actual paths of the devices in the server. This data is transmitted anonymously to avoid privacy issues and possible users concerns. Registered users that downloaded the application (probably in a free or freemium model—pay per premium features) will enter basic personal details upon registration.

One interesting application can display local advertisement in a higher place in the list, if sponsored. For example, if user is looking for a restaurant, the 2 first results will be the sponsored ones (in his vicinity) and only later the other by distance from his current position. Beside search for businesses, analytics and business information as briefly described, indoor users community is audience to location based mobile advertisements. In addition, the proprietary indoor positioning system (IPS) that is deployed gradually can be commercialized as software development kit (SDK or API or library) for third parties.

Prospective Applications

Updated accurate 3D maps of indoor places of interest are valuable. 3D navigation, augmented reality, find your friends and family, disaster control (Panic button that guides you turn-by-turn out of a hotel in emergency), improved Airport time management between leisure, shopping and getting to the gates, automated parking lot mark and find, optimal tour in a mall, coupons and all other local commercial and local advertising initiatives as well as pin point accuracy automated check-in check-out services for four-square-like applications.

It can also connect to facebook and twitter as a leading indoor micro positioning system and method. As per augmented reality, two different users looking on the same shop at the same time can get different advertisements, based on their perforations.

Those are just few examples of useful micro-location (common nickname for indoor navigation) applications that are based on the static infrastructure of a 3D map.

In addition, the traffic in real time, creates an even more exciting live map in 3D (also known as heat map). Multiple uses include real time observation of less and more crowded area, what is going on now, which locations are less toured? Why? It might have an impact on striving for differential rental rates or trying to improve actual traffic to more abandoned areas.

Many applications that ease day to day life and somehow help handicapped personal relies on planning best route indoor for fitted restrooms, restaurants, avoiding stairs etc.

Another category deals with more optimal time management like when to leave to get to car and out in the highway on time, social elements like free parking, free coffee or bad experience.

Some basic map editing tools will be available so that indoor business owners can add their business on the mall map and students can mark their lab or room on the campus map. Half automated filter will be implied between absorbed map updates and publishing them to the map database.

Marking online users (people with devices that are walking or driving) with an icon is supported. Instant messaging between the pedestrian community members is enabled. We remain sensitive to privacy issues by omitting the marker from a non-friend active user under 20 meters (or similar value) to avoid match of name or nickname with a real stranger in a mall which may arose privacy issues.

Community member are able to share things online, broken ATM, locked restrooms, vacant car park or great promotions.

Automated Floor Detection

While surveying in indoor space, as opposed to common outdoor arena, altitude is of great importance. A crucial part of every successful navigation algorithm relies on the floor number. Though intuitively it is the easiest part in self orientation (knowing in which floor I am) automatic floor identification is the base for some very cool applications. Please refer to Application section for examples.

Floors and roofs between different indoor space stories have a distinct nature in term of location fingerprinting map. Wi-Fi signal decreases dramatically (together with most other WAP reception) while changing floor.

Together with inertial sensors (Z axis), other inputs like steps sensing or barometric pressure (a sensor that is incorporated in few mobile smartphones since 2012, while sensitivity and resolution in determining typical story change of 3-20 meter per floor is unclear to us at this stage that can be most probably supported).

Using the GPS signal indoor (although possibly too weak for good positioning) is recorded as part of the location fingerprinting data vectors for every single GP but is also used to determine differences between high floors and lower floors in real time. That will be incorporated while sufficient location fingerprinting is collected and analyzed and by the identification of statistically significant differences between basements, mid floors and near roof representative GPS reception.

Co-Movement (Indoor and Outdoor) of Positioned Users is Analyzed for Applications Analyzing co-movement of different users may lead location based personal advertisement to another level. For example, 3 moving entities (users) within 15 meters between them that are maybe 'friends' (on facebook or the community that will be established around the hereby suggested system and method) around lunch time can hint on looking for restaurant with colleagues from work.

Co moving of a user with a user that is his 'girlfriend' (by same principles—assuming it's known to the system) on her birthday (known as well, through profile registration) on evening time may push a coupon for a more romantic place. If it is daytime and user is walking alone the day before his wife's birthday, present shops and travel agencies related coupons may pop up.

Push message may be used to ask for user help in building the database. Once identified that movement in x, y (corresponds to Northing and Easting for example) is below threshold and no steps are sensed (via the accelerometer and Dead Reckoning related sensor) while Z (up) is increasing and GSM signal is down an "Is that an Elevator" message may pop. This should not be done in a pushy or annoying manner and should definitely be controlled through definitions.

Additional Improvement for Sub-Meter Indoor Positioning Accuracy

Algorithm improvement will eventually include wall, corners and obstacle prediction feature. By analyzing offline the vast collected grid points, sudden changes or inconsistency in Wi-Fi signal strength for adjacent GPs in the location fingerprinting map can point on possible omission of the signal and together with described algorithm for floor plan map creation can produce better modeling of physical walls, corners, floors, windows etc.

That in turn can lay the foundation for the other positioning approach that is based on modeling access point position, transmission power, obstacles and implementing a propagation model that can complement the grid for sub-meter accuracy indoor positioning and indoor navigation.

The described system and method described hereby deals with 'holistic' approach towards indoor micro positioning. Namely, combining the advantages of every existing (and future or expected) sensors onboard the mobile device to enable indoor positioning with no additional hardware.

The method is not limited for indoor positioning and indoor navigation but also for every case that involves poor or limited GPS reception (crowded streets, Center Business District, street markets, parking, underground etc.) it may also apply for outdoor if GPS is inoperative due to poor weather or heavy clouds or GPS system intentional or malfunctioned shut-down.

Current and near future handheld devices and smartphones can rely on inertial navigation, given (accurate, validated and up-to-date) fix points for update every few meters to few tenth of meters. Such updates can be fused into the device and support reasonable accuracy for long lasting indoor navigation.

A detailed crowd sourced location fingerprinting infrastructure (calibration grid or Radio map), as previously described, that relies mainly (but not only) on Wi-Fi AP (Access Points) and Cell Towers IDs and signal reception strength per AP may serve as useful fix points.

The mobile device will measure the signal strength from every received source (including but not limited to Bluetooth, WLAN, GSM, GPS, FM Radio, Ultra-Wide Band infrastructures as will be applicable etc.) and perform a real time match between its reading and an array of adjacent point readings.

Such a match facilitates known algorithms (such as Kalman Filter or Reduced Particles Filter for the inertial navigation together with weighted K nearest neighbors, wKNN, or equivalent) to compute the probability that the device actual position is on (or close enough) to a grid point. Such methods are used for estimating position based on successive, noisy or fluctuating measurements from Wi-Fi positioning and form inertial navigation sensors.

Once deemed within threshold range a fix is performed, feeding the point premeasured absolute coordinates to the total navigation solution. Thus aggregated inertial navigation position drifts are eliminated and pulling the total positioning solution back under threshold. Please refer to system architecture and design considerations.

As described before, the preparation of the Radio map for every place of interest indoor (malls, airports, hotels, museums, hospitals, government buildings, high office buildings, parking lots etc.) is a resource consuming task. This task is probably in the magnitude of Google Streets project in terms of cost and complexity.

It probably requires thousands of employees with high-end measuring devices and expensive equipment deployed in all points of interest indoors for several years. As mentioned, such location fingerprinting map is not constant over time, might differ significantly and thus requires constant updates.

The suggested method and system eases, simplifies and accelerates the resource consuming preparation process of the location fingerprinting map (also referred to here as Radio map). While facilitated for other areas, the social power and efficiency of the pedestrians and drivers that carry mobile devices has not yet been harnessed for such task.

Many people that carry their mobile device will contribute to the gradual process of structuring a calibration map. While outdoor, still with GPS reception continues fix will be made to the inertial navigation system.

When GPS signal is too weak for indoor positioning (yet valuable to specify each unique indoor place via its recorded location fingerprinting together with described signals), inertial navigation will take over and use the time window in which it has acceptable accuracies. Additional methods, namely dead reckoning (DR), map matching and Cellular based positioning will elongate this window in a manner that will be described.

Both when outdoors and indoors and as long as application is operative, sensor are sampled periodically. Wi-Fi ID and signal strengths, Cell tower ID and strength (along with other existing or future built-in sensors as deemed such as relevant barometer, ambient air temperature etc.) such sensors will be recorded every short time interval (probably between 3 and ⅕ Hertz) to ensure production of new grid points.

Each collected vector of data is deemed position specific as a pedestrian typically moves indoor at a velocity of around 1-2 m per second and sampling requires around one second. Since the process described here addresses the case in which an indoor place is with no prior data, fix points do not exist.

Fix points are created and collected on a data base on the server. Each collected grid point (that will become a fix point) is marked with a number (grade or rank) that is correlated with its estimated accuracy in terms of absolute location and another grade for the quality or length of one or more long measurements (made while user was static). The estimated accuracy is primarily a function of the time since the last update.

EXAMPLE

The first man to enter an indoor place of interest with his mobile device (in pocket, hand, or every other place) for the first time (assuming he had downloaded the application and launched it) will have a very good accuracy upon first losing the GPS signal. Typical accuracy of few meters is achieved by GPS fix and the application inertial navigation system (with Cellular positioning, DR and map matching) measures his displacement based on the described method.

After one second, we know his absolute position with excellent accuracy and can definitely record a vector of data (Wi-Fi, GSM, GPS/A-GPS and other sensors) for that specific grid point. If we assume that 1 Hz is a good rate (we know his velocity so we can adjust the resolution of the required grid) he can measure and record 9 additional grid points in the first 10 seconds since last fix. AGPS or A-GPS refers to standard assisted GPS on mobile handheld devices.

Please notice that at this stage, in real time, those recorded points are useless for him. User can only rely on totally independent methods that include Cellular positioning (based on triangulation of cellular towers), inertial navigation, dead reckoning (DR) and map matching (assuming floor plan was submitted or otherwise added to the system prior to the first survey which is beneficial but not mandatory).

We can also say that after a period of time, accuracies drops to a point in which indoor positioning is of limited benefit to him. When more than one Cellular tower, possibly from more than one cellular operator is available, regardless of the one (operator) that is chosen automatically for use (cellular communication), Cellular positioning solutions are also used by the system and are ranked for their matching in movement direction and velocity with inertial navigation solution.

However his survey contributed calibrated grid points. He enriched the database with up to date measurements from indoor location. The 'collected' grid points will in turn serve as fix point for the next (or same at later time) person (user) entering the same indoor place.

Given an airport for example with few entrances (for simplicity we assume street level parking and not underground although method and system is applicable in that case as well). A few early users entered in the past using the described application on their mobile device (smartphone, handheld etc.).

A critical mass of individuals downloaded, installed and launched the application (incentive for doing so before the indoor area is covered with measured grid points is described on this paper).

A pedestrian enters the Airport (and loses GPS signal), he is going through an entrance and his device records (automatically) sensor data vectors for new grid points. While walking, after few seconds the device identifies that he is in close vicinity to a (premeasured by earlier visitor) grid point.

The system uses this grid point as a fix point. The inertial device's navigation system errors are eliminated and he is now ready to penetrate deeper to the Airport hall as it is almost identical to a GPS signal that fixes his system. He keeps recording (or marking) new grid points all the time but their grade (in terms of their position accuracy is higher again).

After a while many valid grid points are added gradually and automatically to the database. This enables more fix points for the other users (that runs the application) and gradually support full positioning system for the entire indoor Airport hall.

While indoor, the 'holistic' (or integrative) approach that we hereby describe keeps looking for sources for fix points. If for example a GPS signal will be sensed near a big window that would again increase the grade (absolute position accuracy wise) of the consecutive (and other adjacent) collected grid points, while reset all accumulated errors supporting better positioning right away.

The described method, while requiring no additional hardware (nor to mobile device neither to the indoor area) and eliminates the need in a long exhausting, very costly, ongoing calibration process (used to measure grid points without harnessing the power of the visiting audience) maintains, by itself, the infrastructure.

Even well covered indoor areas with crowded, accurate and validated grid points (with up to date vector data for each and every point) are recorded continuously all the time. Thus a missing access point, additional cellular tower or inconsistent Bluetooth reception is easily coped with.

Since algorithms that are used to compute one's location in real time (for example weighted K nearest neighbors algorithm or similar) relies on a rather wide vector of recorded data. This robust implementation, records an updated data vector for the point (back office handling of different data vectors for same location will include controlled fusion and publish to database of new data automatically once change is validated) The probability analysis yields pretty good guesses as to the exact device position even with omitted, missing, shifted or new Cell towers, access points etc.

The detailed described system and method described herein is new and innovative as well as implementable for concrete uses in very attractive business areas.

Enhanced Handheld Device's True Movement Direction Extraction.

When trying to measure true movement direction few methods can be implied. Dead reckoning, pedometer and or inertial navigation are the most common methods.

Inertial navigation uses measured acceleration from built-in accelerometers. Measured accelerations can be transformed from device axis to Earth coordinates to eliminate the dependency in device orientation. Gyroscopes may be used to detect minor changes in orientation etc. Integrating accelerations to changes in velocity and then integrating again changes in velocity to changes in position can yield the estimated distance in Earth coordinates. When added to a known starting point, new estimated position is computed.

The benefits of inertial navigation are that both direction and speed are known. The cons are the rather severe drift in position estimation. When the device is a smartphone, with no additional hardware unit (to improve sensors), the accelerometers are noisy and may be biased. Both phenomena can be treated and somehow mitigated. Even when mitigated, double integration of noisy and biased inputs yields a fast drift that makes pure inertial navigation with the device unusable after a few minutes or less.

Pedometer may be complementary to inertial navigation. This approach makes a few estimations on movement track. Steps can be sensed and stride can be estimated in various ways (human weight and height, outdoor precalibration of step length with available GPS readings—mainly when outdoor, strength and pattern of vertical accelerations—towards the Earth center etc.) As for the direction of the movement pedometer is rather limited. Map-matching algorithms can be facilitated assuming given map or floor-plan or it may require user to hold device straight and level for heading input, thus making the use of the device ridged and not intuitive.

Dead reckoning on its most primitive implementation assumes known direction and velocity or number of steps to estimate new position and may rely on any combination with pedometer, inertial navigation or both.

The described approach estimates the direction of the device directly from the accelerometers. It eliminates the need in double integration of noisy biased built-in device sensors, and makes the use intuitive since any device orientation is permitted while walking.

Each Human step can be divided into four distinct segments 201-204 as appears in FIG. 19 that illustrates a user 200. Starting with standing (which may be refer to as segment zero), the first one (marked as 201) is moving the leading leg (right) ahead (in the sketches forward is up for the top view. For the side view forward is right and right leg is moved first). The second (202) is laying the leading leg (right) in new position. The Third (203) is 'collecting' our other leg (left) and moving it forward. The Forth (204) is laying the other leg (left) in the new position. Then the next step begins etc. For simplicity, we can ignore the difference between a first step—from standing (or last step—to standing) position and between a 'serial' step which is not the first or last.

Both top view (upper) and side view 201-204 of a standing man. Forward is towards up for the top view and to the right for the side view. There are also provided three lines 201', 202' and 203'—located at the starting point, middle point and end point of the person's step. These lines are fixed in place and simplify the division of each step to four segments. They appear for both top views and side views (small red triangles) as a reference for man movement. On the next pair of images, marked 201 (second for the left) leading leg (right) is moved forward). Later on the next pair of images marked 202, leading leg (right) is put on the ground, setting a new line. On the next pair of images, marked 203, the other leg (left) is taken from behind and moved forward and on the last pair of images (204) the other leg (left) is put on the ground and a third line is added to mark the end of this step. When the leading leg (right) is taken from behind and moved forward a next step will begin with segment 201 again Analyzing the step pattern in terms of accelerations is analyzed schematically in FIG. 20 and reveals that on the first segment increasing horizontal accelerations 211 (parallel to Earth surface) towards the leading leg are measured. Those are built in a scattered manner that is somehow similar to a fan. The maximal values of the acceleration (denoted 211(1) and 211(2) in FIG. 21) are processed in terms of its heading. Averaged Headings are used to determine the main heading of segment 201.

Figure 20:
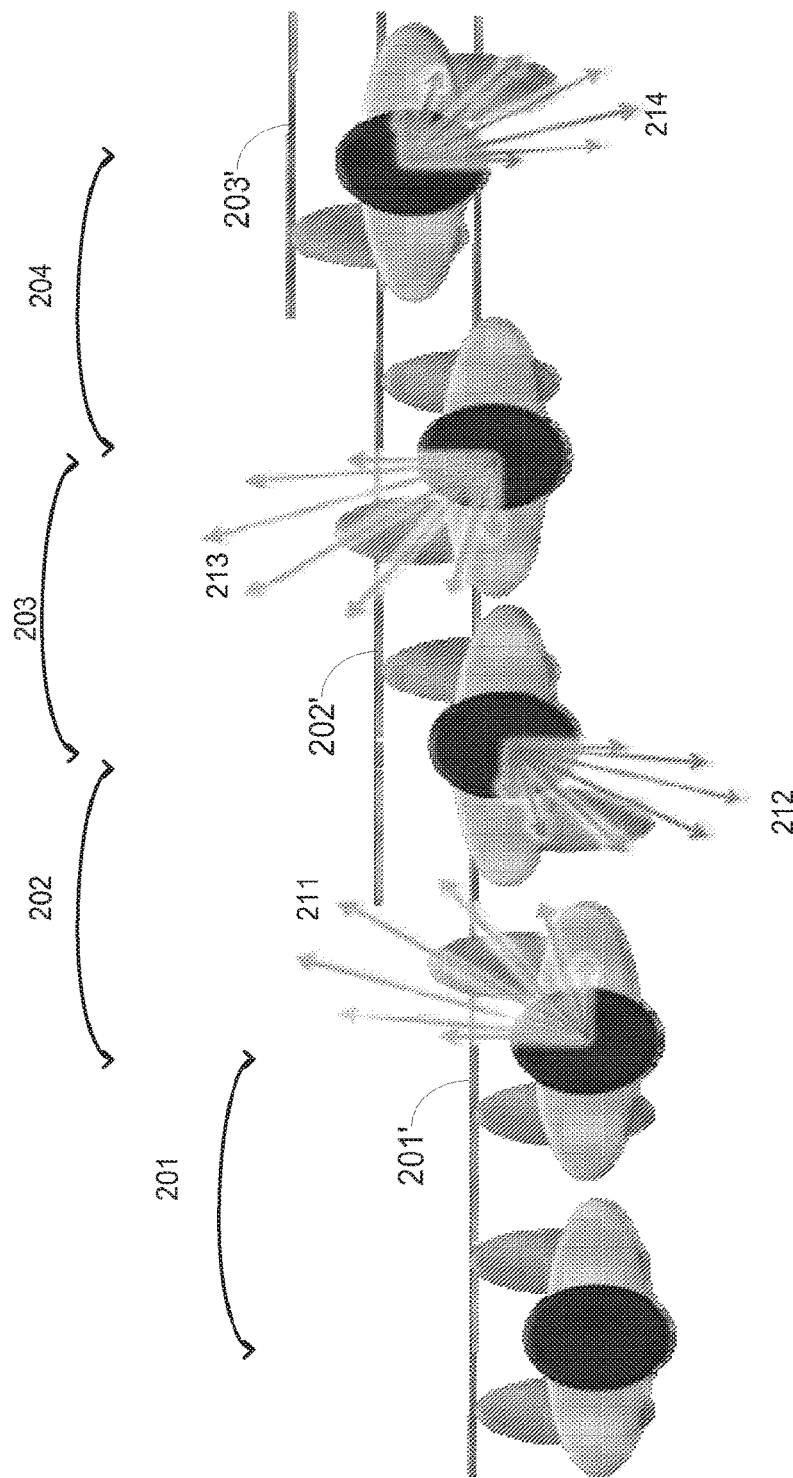

FIG. 20 illustrates typical acceleration patterns 211-214 as appears while walking can be seen here. Segment 201 starts with accelerations 211 towards the leading led side (right), then accelerations towards forward (in this top view, forward is up) gets stronger. Then the body is slowing by decelerating and accelerating back (212) towards the center segment 202. Symmetrically segment 203 of each step typically build increasing accelerations (213) towards the side of the other leg (left) and forward (up) again while segment 204 decelerates 214 (in terms of forward movement) and back to center.

Segment 202 produces a fan like acceleration pattern 212 that indicates the body tendency to 'stop' just before it launches the other leg (segment 203) and so on. Measured accelerations are changing size and direction rapidly.

Segment 203, like segment 201 produces a fan like acceleration structure 213 towards the other leg, now sent forward. The maximal values of the acceleration (denoted 213(1) and 213(2) in FIG. 21) are processed in terms of its heading. Averaged Headings 221 are used to determine the main heading of segment 203.

Segment 204, like segment 202, produces a fan like acceleration pattern 214 that indicates the body tendency to 'stop' just before it launches the other leg (segment 204) and so on. Measured accelerations are changing size and direction rapidly.

Figure 21:
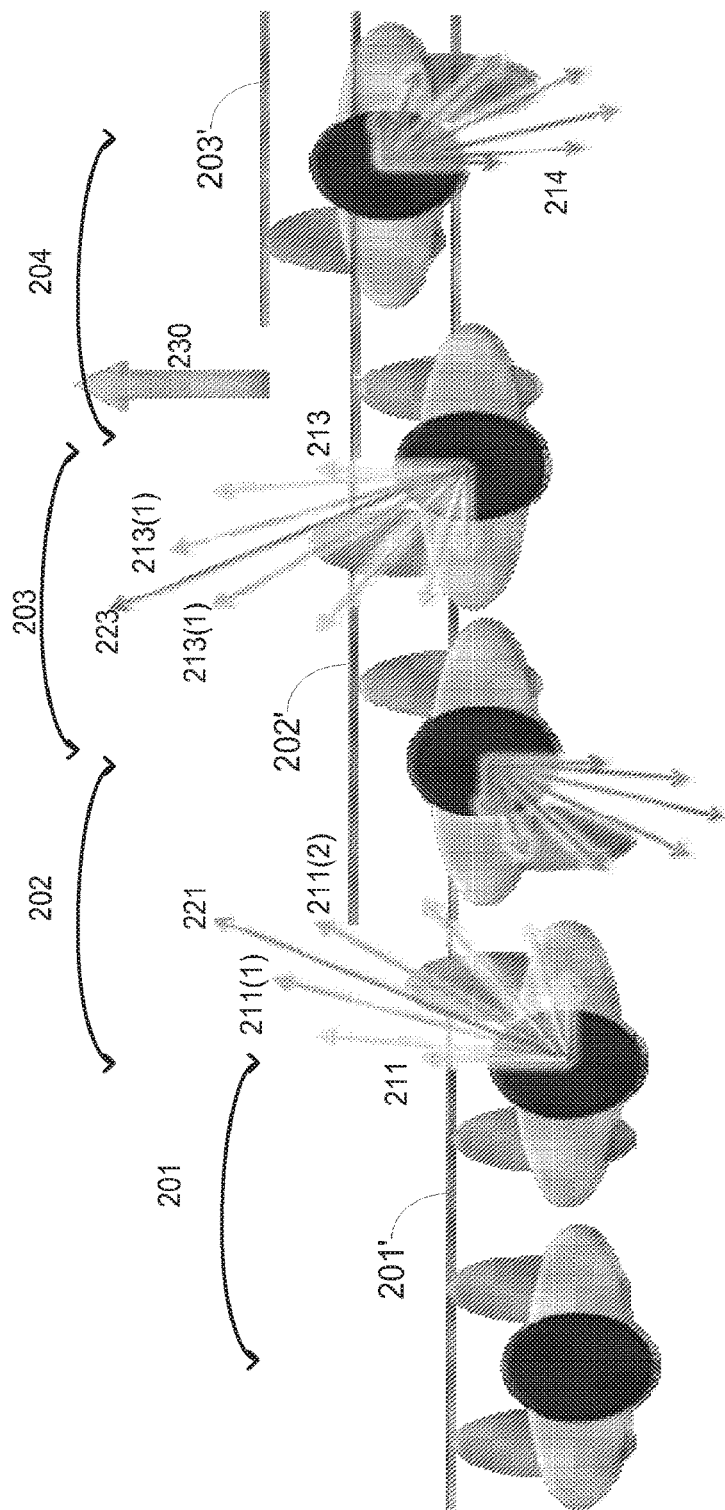

FIG. 21 illustrates maximal accelerations 211(1) and 211(2) in segment 201 and maximal accelerations 213(1) and 213(2) in segment 203. It also illustrates the sum vectors 221 and 223 of maximal accelerations in segments 201 and 203. Summing together maximum accelerations (vectors) in segment 201, creates the segment direction 221. Summing up the two sum vectors 221 and 223 for segments 201 and 203 accordingly, reveals the true estimated step heading 230. In addition, same procedure for segments 202 and 204 gives us the opposite direction that can further support and fine tune our forward moving direction and help with partial steps (that do not contain a full step). While filtered over time, actual step direction yield improved solution of actual momentary device movement.

As described maximal acceleration vectors per segment are summed. Headings used to determine the main heading of segment 201 and 203. Then representing vectors for segments 201 and 203 are summed. The sum is used to determine the actual direction of the last step (four segments). That direction put together with any estimation of step size or stride, determines enhanced estimation of difference in position from last known position.

Dividing the pedometer to its two primal elements, namely direction estimation and velocity (and or number of steps, and or amount of change in position) and taking care of the direction in the suggested approach enables us to get more out of the device's built-in sensors. We require no constrains on device orientation and reduce the double integration related errors that come into play when pure inertial navigation is implemented.

This enhanced pedometer can work stand-alone or as part of indoor (or outdoor) positioning and navigation system for handheld devices and smartphones that is based purely on software.

Enhanced Handheld Device's True Orientation Extraction

Device's orientation is concluded based on internal sensors. Accelerometers measure acceleration in device axis. The earth acceleration is approximately 9.81 m/s2 towards the center of Earth and is usually designated 1 g. Since other day-to-day related accelerations (especially walking accelerations) are generally smaller than 1 g, current device's orientation solution performs approximation. Assuming that the total (vector sum) of all sensed accelerations is also pointing to the center of the Earth simplifies orientation solution. This simplified method is a necessity as will be explained.

Having defined the local vertical line pointing towards Earth center in that manner enables calculating a surface that is parallel to Earth face (and orthogonal to the vertical line) That surface in-turn enables estimation of the Azimuth or Heading offset from magnetic (or Geometric) North, based on device's built-in magnetometers. Than the elevation can be measured (Pitch), and tilt can be measured (Roll). Device's built-in Gyroscopes readings, when applicable, optionally come into play to smoothen and better cope with noisy readings.

The device does not 'know' it's orientation and we cannot assume the device is held straight and level when operating. Estimated Heading, Pitch and Roll can be used (using rotation matrix or equivalent methods) to transform device measured data (accelerations, magnetic field etc.) to Earth coordinate system.

Figure 22:
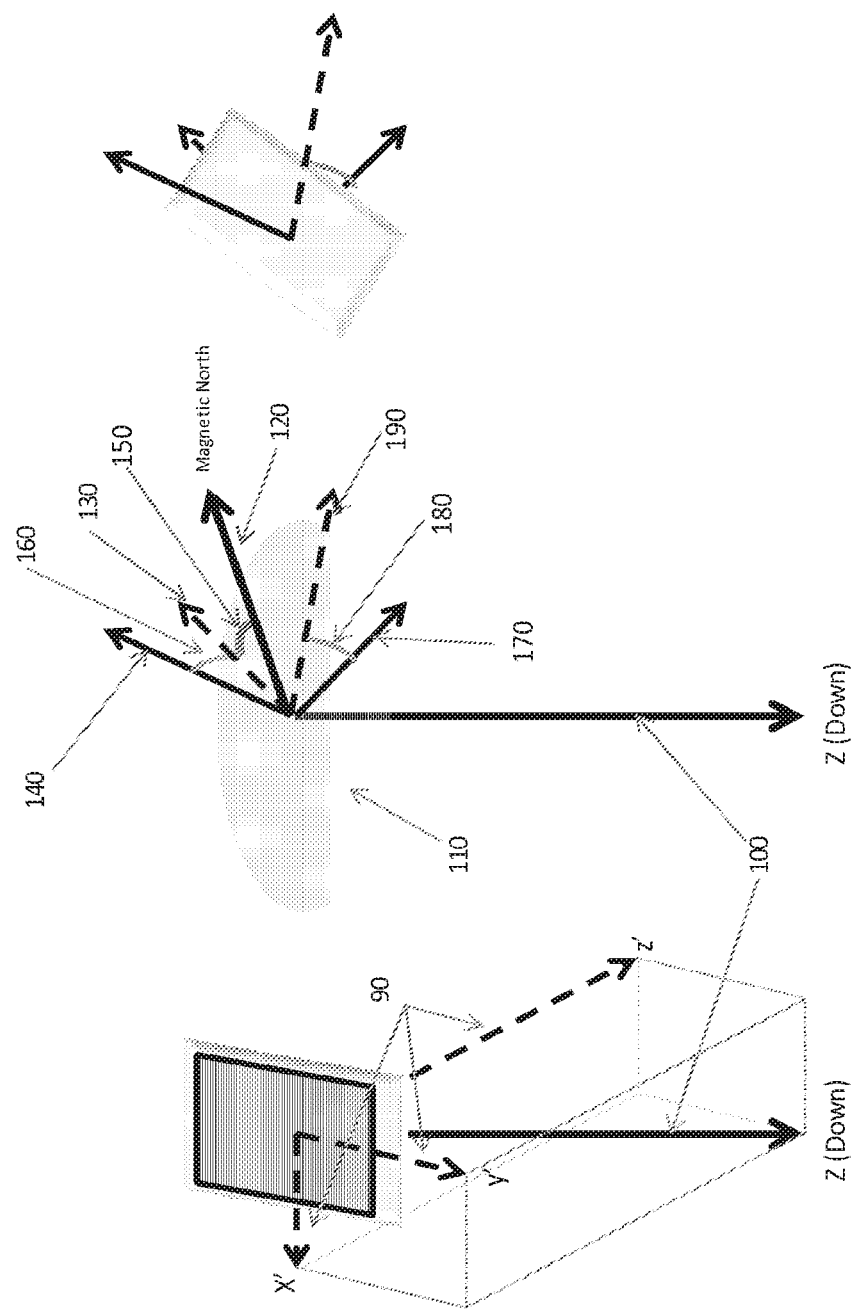
FIGS. 22-23 illustrate various forces and coordinate systems according to various embodiments of the invention.

Accelerations are measured in 3 device's axis. The left picture of FIG. 22 depicts typical measurement of 3D accelerometer. Such measurement in device axis is marked 90. Total of three measurements correspond to device axis x, y and z accordingly. Assuming the device is static (we assume its location and orientation are fixed although in general case it can rotate around itself but is latitude, longitude and altitude are fixed) the total acceleration is pointing to the center of Earth, marked 100. Based on that calculation an orthogonal surface 110 can be found. As 110 is perpendicular to 100, it's assumed parallel to theoretical Earth surface. This surface 110 is the reference for the device's orientation computations. Magnetic North 120 as measured by the Magnetometer and is part of 110 (the surface). Device Heading 150 is the angular difference between the projection 130 of the device's longitudinal axes 140 on 110 (the surface) and between 120 (the Magnetic North). Pitch 160 (the angle between 130 and 140) and Roll 180 (the angle between latitudinal devices axis 170 and between 190 when 190 is orthogonal to 130 and part of 110) are computed accordingly (in reference to 110 AND 120) and a full set of three angles represents the device orientation. The dashed arrows that appear on the center and right drawing (FIG. 22) represent 130—the projection of longitudinal device axes on surface 110 and 190—the projection of latitudinal device axes on surface 110. 130 and 190 are orthogonal and are both belong to surface 110. Only when Pitch is Zero 140 is part of 110. Then if Roll is Zero 170 is part of 110. When heading is Zero 120 and 130 are coinciding.

A built-in loop is created since the transformation of device accelerations to Earth (simplified) coordinates is required for estimating device orientation, which in-turn is used to convert device accelerations (and other vector data) to Earth coordinates creates an inherent circle. That explains the necessity for the above mentioned simplified method (that assumes that total vector sum of all measured accelerations points to the center of Earth).

As long as horizontal accelerations (parallel to Earth face) are negligible, the error in vertical line 100 estimation (as well as for corresponding errors in Heading 150, Pitch 160 and Roll 180) is insignificant. However, when high precision is required (e.g. implementing inertial navigation), those relatively minor errors in device orientation pose serious challenges (especially when double integration—the mathematical procedure associated with extracting change in velocity based on measured accelerations, and changes in position based on velocity computed changes—is involved. When accelerations that are related to walking get into play, up to 1-2 g's can be measured in the movement direction and significantly bias the direction of the line 100 that should point down. These errors 'tilt' the theoretical surface 110, causing bigger and bigger device orientation errors. Those errors cause bigger mistakes in next time unit computation of device's heading 150, pitch 160 and roll 180.

Figure 23:
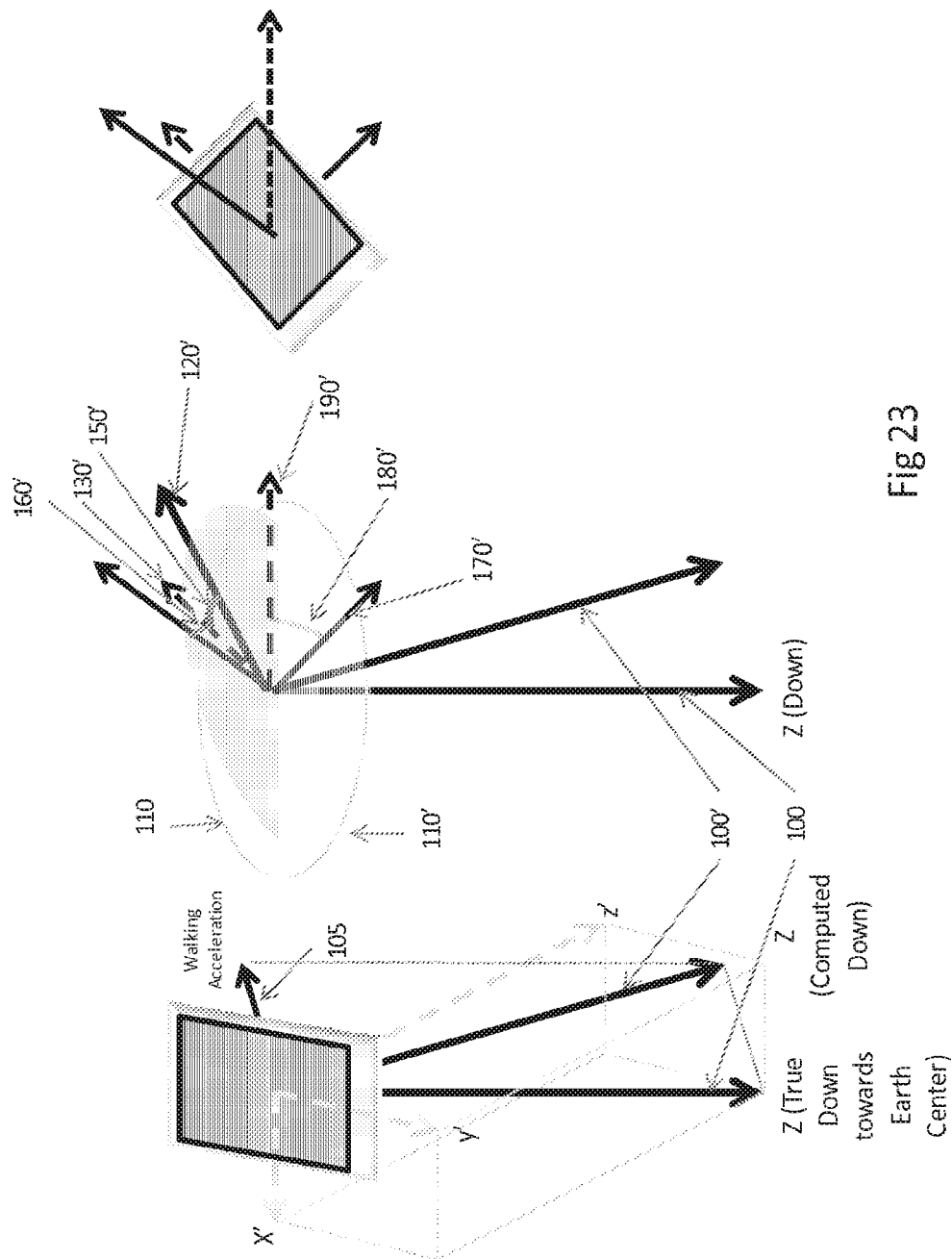

FIG. 23 illustrate that additional walking acceleration 105 is added, marked in Black arrow. For simplicity we assume that orientation is fixed and identical to FIG. 22 and very little time passed. There is a way to know we started walking because we were static (i.e. no steps were sensed if we use a pedometer or otherwise) and now we are not static. The walking related acceleration 105 is added to the former Z 100 arrow, and the computed Z 100' is now erroneous since it is no longer pointing to the Earth center. Accordingly we see that the surface 110', marked in Grey, is tilted to the left and pitched a little up because the surface, by definition, is orthogonal to 100'. The outcome on the right side is considerably different pitch and roll angles.

The surface 110' pitches up (that is not real but an outcome of adding acceleration 105) 'reduces' the computed pitch as the baseline for computation surface 110' got closer to the device's longitudinal axis (FIG. 22140) that was computed in earlier cycle (right side of FIG. 22). The surface 110' left tilt increases and so computed right roll as surface 110' got further away from the reference (FIG. 22190) that was computed in earlier cycle. As a result the device now computes roll 180' and pitch 160' that are different then the case when device was static (user did not walk). Similarly, errors in heading 150' occur when surface 110' replaces previous surface 110. Although no actual change in orientation occurred (assumed for simplicity) the addition of acceleration 105 yield erroneous orientation computations that in turn create erroneous breakdown of device accelerations and conversion to Earth coordinate system. It happens because we started to walk and so acceleration 105 was added but we continued estimating the vector that points to the center of Earth 100' (previously 100) and based on that updated surface 110 to 110'. Those mistaken values are the input for the next time unit etc. The device on FIG. 23 to the right appears with smaller up pitch and bigger right roll then the one in FIG. 22 to the right. Errors in the device's magnetic heading can occur as well. The dashed arrows that appear on the center and right drawing (FIG. 23) represent 130'—the projection of longitudinal device axes on surface 110' and 190'—the projection of latitudinal device axes on surface 110'. 130' and 190' are orthogonal and are both belong to surface 110'.

The system and method described hereinafter takes advantage of the fact that movement tracking may assume some assumptions on Human movement. If we identify a walking pattern, for example by repeating significant changes in accelerations, by pedometer or by position changes etc. we can estimate the size and direction of horizontal accelerations. We can also assume that Earth surface is locally flat and level (that is even more accurate for indoor positioning).

In a similar manner, when we are not walking (we identify that by a pedometer that indicates no steps for example) we can sometime assume that we are not moving at all (not always, because we may be moving on an escalator, or even a vehicle while not walking) In that case we know that the total acceleration 100 should point to the Earth center and thus the orthogonal surface 110 (parallel to Earth surface) is the most accurate one. We set this a baseline and when we identify steps (start walking), we expect an error in the vertical vector direction 100' computation (because of the added horizontal accelerations 105 of walking) We then compensate for that by not taking into consideration those horizontal accelerations 105 (that are directly related to walking now) and stick to the precomputed orientation reference 110 (orthogonal surface—parallel to Earth surface) instead.

Once we have estimated the size and direction of horizontal accelerations 105 we can leave it out when computing the local vertical line 100 (that points to the Earth center). Please refer to FIG. 23 as if we eliminated the Black arrow 105 since we know it's related to walking to estimate if a 'mixture' of horizontal accelerations with vertical 100 (Earth related acceleration) occurred, the total acceleration is also considered. In case that total acceleration is significantly different then 1 g we suspect that such mixture occurred and eliminate the horizontal vector from the momentary vertical line direction and size computation. The horizontal walking related acceleration cannot be measured purely but is rather included in the device 3D acceleration measurement, yet we suspect it's there and do not take a relevant portion of horizontal accelerations into account. The outcome is closer to FIG. 22—we walk, but we know that we walk, so we keep computing the line towards Earth center 100 based entirely (as possible) on Earth related accelerations, thus minimizing walk related horizontal accelerations effect on orientation errors because we maintain 110 (and not 110') as our reference surface mitigating errors in orientation.

Device's built-in Gyroscopes readings are also used to evaluate the actual change in orientation from previous time measures. Actual (true) device orientation change can be also sensed as changes in Gyroscope readings that represent angular accelerations. That is important because device's orientation changes can be concluded also from changes (such as noisy or biased accelerometer reading or changes in magnetic readings) that are not necessarily related to actual orientation changes.

Such manipulation enables more accurate estimation of the local vertical line 100. That in turn enables better estimation of the surface 110 that is parallel to Earth face, and in-turn reduces errors in Azimuth 150, Pitch 160 and Roll 180. Reduced errors in device's orientation significantly enhance double integration accuracy and enable improved inertial navigation and other applications.

Integrating commercial sensors (accelerometers, gyroscopes, magnetometers etc.) into smartphones creates many opportunities for location related applications. Inertial navigation is one exciting use. Sensors in the device are, although improving, noisy and biased. Inertial navigation is extremely susceptible to noisy and biased sensors data due to its computational nature. Reducing errors in device's sensed orientation is a key for better estimation of related physical sizes.

That is achieved by examining the accelerations, gyroscopes and magnetometers readings in a more comprehensive way. The accelerations, when applicable, are divided into vertical (Earth related) and horizontal (movement related). Vertical line 100 (that points to the Earth center) is more accurately estimated.

The theoretical surface 110 that is parallel to Earth face (and orthogonal to the vertical line 100) is more accurate in terms of its Pitch 160 and Roll 180. Splitting next cycle's readings is more precise and so 110' is closer in orientation to 110 (assuming for simplicity that no actual orientation change occurred). Double integration (as well as other application) drifts slower and produces better estimations.

Enhanced Indoor Navigation Positioning Accuracy

Few methods are considered for indoor navigation. When GPS reception is insufficient, other approaches are considered for accurate positioning. Those methods may include location fingerprinting. That is done through a process of recording location specific readings in terms of Radio Frequencies (RF) such as Wi-Fi Access Points (WAPs), GSM, FM, Earth Magnetic field, ambient sound, ambient light and additional sensible data based on device's capabilities. Those can be combined with cellular location (that is mostly available indoors though not very accurate) to achieve better indoor positioning accuracies.

Such location finger printings may differ, among other things, by their nature, physical attributes, scale, variations, metadata, resolution and thus achievable accuracy. Better understanding of the overall and current accuracy of each method enables enhanced indoor positioning.

A system and method for improving indoor positioning (that can be fully applicable to outdoor as well, to improve, complement or replace GPS reception) is hereby disclosed.

State of the art cellular positioning (such as the one Google implements in Google Maps mobile application) usually produces no better than 30 m accuracy. Magnetic field measurement that is compared to a learning set (that was collected in advance) may sometimes distinct between points that 10 cm apart. Location fingerprinting based Wi-Fi positioning (collected by precalibration that is also known as war driving or war walking) can easily detect different floors and get in floor accuracy of 4-7 m. FM location finger printing may enable accuracy of 10 m indoors.

The down side with the previously described very high resolution of magnetic field is that its units are micro Tesla and every place on earth corresponds with values well within that only few (+−) hundreds of micro Tesla. As for the magnetic field direction, same problem occurs as it is expressed in degrees (0-359). It may tell the difference between two adjacent points indoors, but all over the world, numerous points have same or very similar readings. Similarly, FM radio signals may distinct between two nearby points indoor as their location fingerprinting are different but may as well be identical to many other points over huge area.

When we try to harness magnetic field data for indoor navigation, starting with comparison of real time magnetic field data against the precollected learning set may prove useless. The algorithm may find it extremely similar to too many different points. If however we know that we are in an uncertainty area of few meters by few meters, magnetic field may prove the best tool to refine our accuracy further. Similarly, if we know that we are within few 10 s of meters, FM Radio can help us refine the accuracy.

The funnel-like approach expands this method to all currently available (and future detectable readings, such as emerging cellular pico-cells or femto-cells and enterprise level APs as well as digital video broadcast (DVB) etc.) location finger printing sources. The method dynamically defines the order from coarser towards finer and finer positioning aids. Dynamic implementation of location fingerprinting related (and other) signals by their increased real time accuracy may be described as a funnel narrowing down. If we know that the cellular positioning enables 30 m accuracy now, we then apply the FM (or another source as may be available in real time) for reducing the uncertainty. That in-turn improves the accuracy 10 m (which is for example the current FM accuracy indoor). Only then the WAPs (Wi-Fi Access Points) may come into play and improve the indoor positioning accuracy to 5 m. Then the magnetic field is used to choose the in-room positioning and get to 1-2 m accuracy.

That described system and method constantly facilitates statistical algorithms to evaluate the accuracy (or uncertainty in localization) of every different positioning module. It then marks it automatically with a corresponding dynamic weight that represents its current accuracy and level of certainty. If for example no WAPs are sensed (lower level parking for example), that may change the order of the chain to rely more on other reliable sources. If the FM accuracy currently dropped to 40 m and for some reason the cellular positioning inaccuracy is now 30 m cell location will be used to refine FM based positioning (or we zeroes FM weight and so ignore it temporally—until its accuracy is better again). In that case, map matching algorithm will be used to significantly enhance the accuracy.

It is important to maintain the funnel-like shape—a hierarchy from lower accuracy towards higher accuracy dynamically, in real time, based on true available data because using ridged predefined (as oppose to real time dynamic) order would use map matching, for example, at a certain stage regardless of the available sources or may try to match magnetic field readings as first step resulting many possible matches and thus suboptimal accuracy.

Another aspect of using only the available positioning modules at the correct order is improved efficiency as cleverer dynamic downloading (from the server to the device) of only relevant database subsets, perhaps with some margins, is enabled. When funnel-like accuracy enhancement is implemented less data points that serves as base line for comparison are transmitted back and forth. That in-turn requires much less data traffic, less load, smaller band width and significantly longer device battery life.

Figure 24:
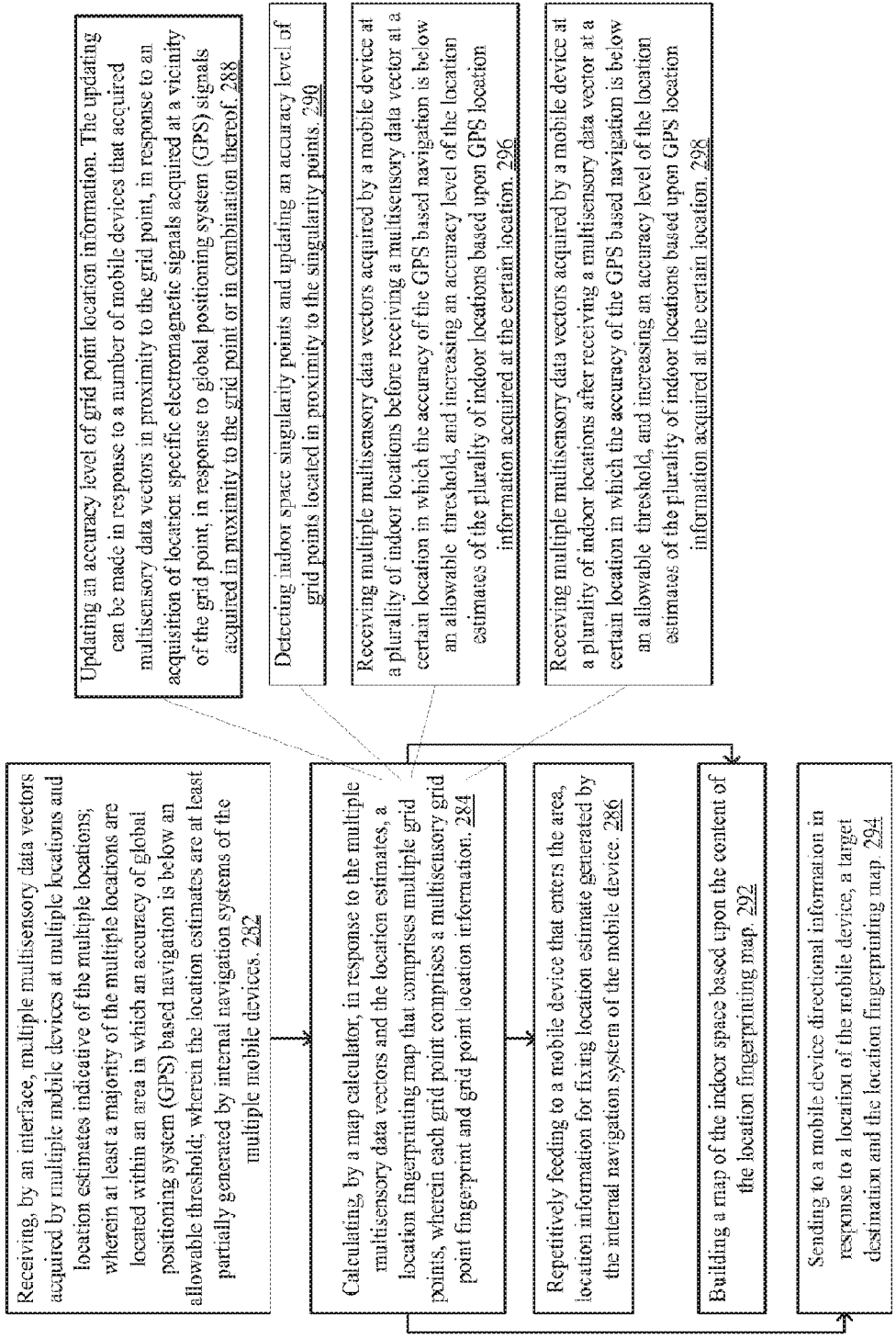
FIGS. 24-28 illustrate various methods according to various embodiments of the invention.

FIG. 24 illustrates a method 280 according to an embodiment of the invention.

The method 280 may be used for building a multisensory location map, and may include: (I) receiving (282), by an interface or automatically, multiple multisensory data vectors acquired by multiple mobile devices at multiple locations and location estimates indicative of the multiple locations; wherein at least a majority of the multiple locations are located within an area in which an accuracy of global positioning system (GPS) based navigation is below an allowable threshold; wherein the location estimates are at least partially generated by internal navigation systems of the multiple mobile devices; and calculating (284), by a map calculator, in response to the multiple multisensory data vectors and the location estimates, a location fingerprinting map that comprises multiple grid points, wherein each grid point comprises a multisensory grid point fingerprint and grid point location information.

The calculating (284) may include correlating, by the map calculator, the multiple multisensory data vectors and the location estimates, to provide the location fingerprinting map.

The method may include repetitively feeding (286) to a mobile device that enters the area, location information for fixing location estimate generated by the internal navigation system of the mobile device.

The method may include updating (288) an accuracy level of grid point location information. The updating can be made in response to a number of mobile devices that acquired multisensory data vectors in proximity to the grid point, in response to an acquisition of location specific electromagnetic signals acquired at a vicinity of the grid point, in response to global positioning system (GPS) signals acquired, even if insufficient for positioning solution, in proximity to the grid point or in combination thereof.

The method may include detecting (290) indoor space singularity points and updating an accuracy level of grid points located in proximity to the singularity points.

The method may include building (292) a map of the indoor space based upon the content of the location fingerprinting map.

The method may include sending (294) to mobile device directional information in response to a location of the mobile device, a target destination and the location fingerprinting map.

The method can include calculating a location fingerprinting map that is a three-dimensional map.

The method may include receiving (296) multiple multisensory data vectors acquired by a mobile device at a plurality of indoor locations before receiving a multisensory data vector at a certain location in which the granularity of the GPS based navigation is below the threshold, and increasing an accuracy level of the location estimates of the plurality of indoor locations based upon GPS location information acquired at the certain location.

The method may include receiving (298) multiple multisensory data vectors acquired by a mobile device at a plurality of indoor locations after receiving a multisensory data vector at a certain location in which the granularity of the GPS based navigation is below the threshold, and increasing an accuracy level of the location estimates of the plurality of indoor locations based upon GPS location information acquired at the certain location.

The multisensory data vector may include electromagnetic information, including communication related electromagnetic signals (signals generated during communication), at least one out of ambient noise, temperature, earth magnetic field information and even pedometer information.

Especially, stages 288, 290, 296 and 298 may be included in stage 284 and stages 286, 292 and 294 may follow stage 284.

Figure 25:
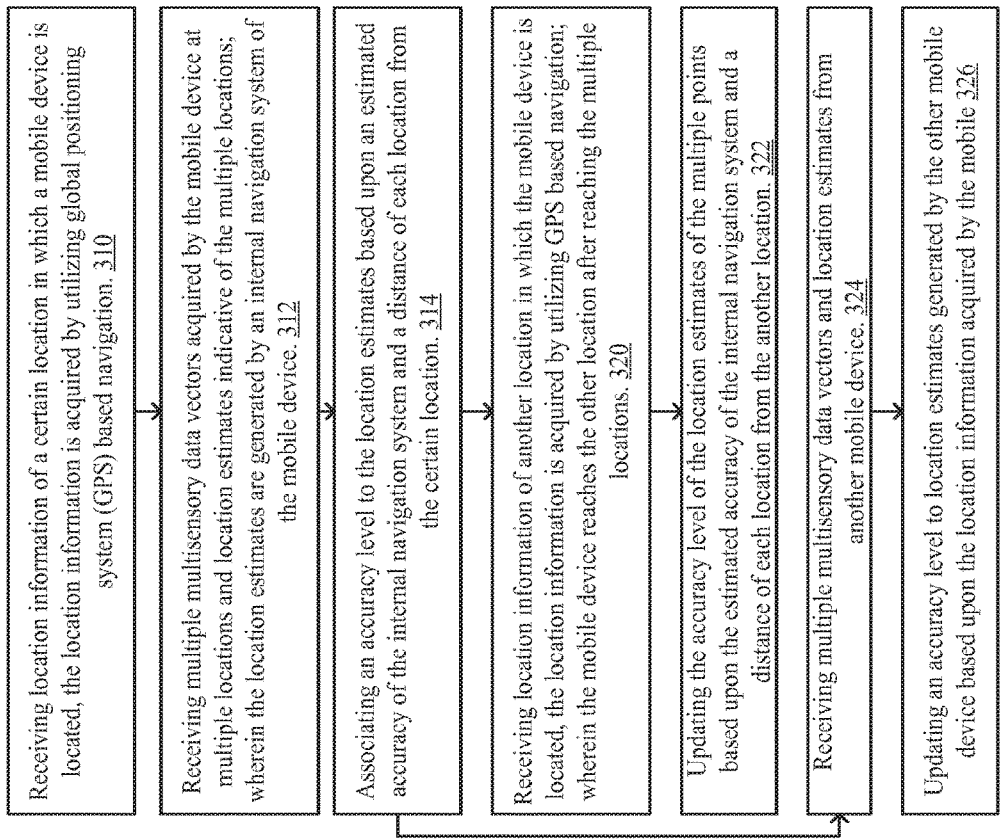

FIG. 25 illustrates a method 300 according to an embodiment of the invention.

Method 300 may include: receiving (310) location information of a certain location in which a mobile device is located, the location information is acquired by utilizing global positioning system (GPS) based navigation; receiving (312) multiple multisensory data vectors acquired by the mobile device at multiple locations and location estimates indicative of the multiple locations; wherein the location estimates are generated by an internal navigation system of the mobile device; and associating (314) an accuracy level to the location estimates based upon an estimated accuracy of the internal navigation system and a distance of each location from the certain location.

The accuracy levels may decrease with an increase of a distance or elapsed time from the certain point.

Method 300 may also include receiving (320) location information of another location in which the mobile device is located, the location information is acquired by utilizing GPS based navigation; wherein the hand-held device reaches the other location after reaching the multiple locations; and updating (322) the accuracy level of the location estimates of the multiple points based upon the estimated accuracy of the internal navigation system and a distance of each location from the another location.

Figure 26:
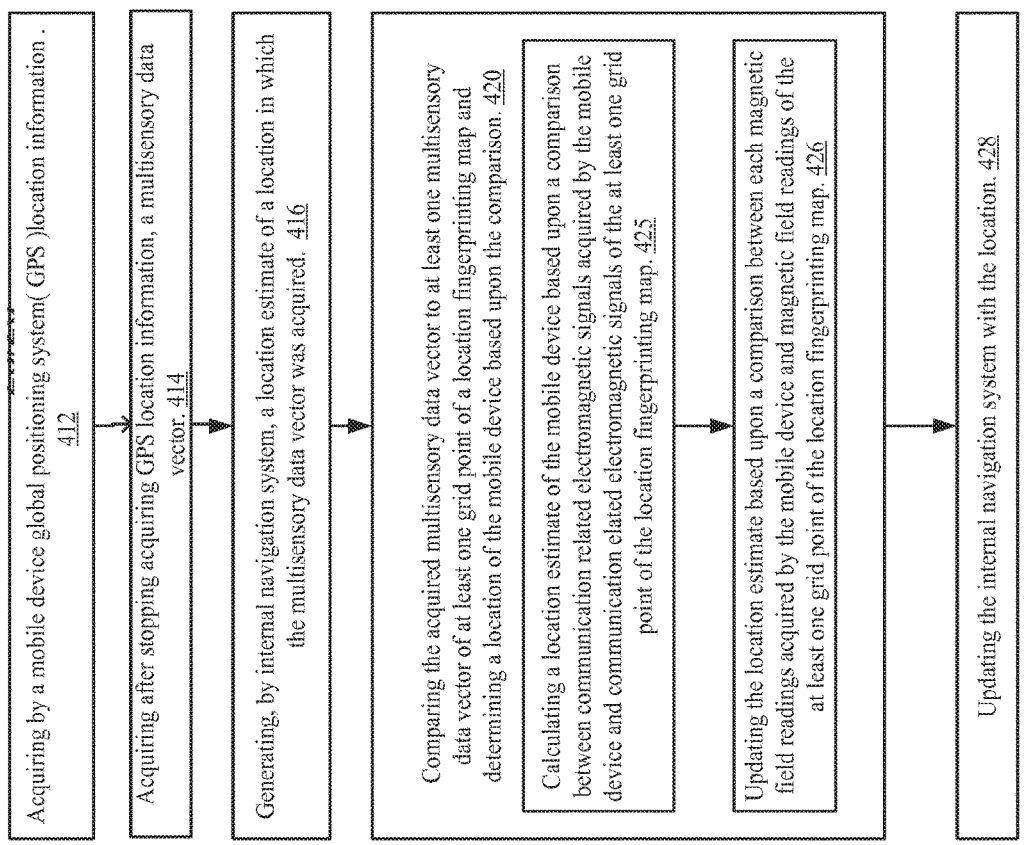

The method may further include receiving (324) multiple multisensory data vectors and location estimates from another mobile device and updating (326) an accuracy level to location estimates generated by the other mobile device based upon the location information acquired by the mobile FIG. 26 illustrates a method 400 according to an embodiment of the invention.

Method 400 may include: acquiring (412) by a mobile device global positioning system (GPS) location information; acquiring (414), after stopping acquiring GPS location information, a multisensory data vector and generating (416), by internal navigation system, a location estimate of a location in which the multisensory data vector was acquired; comparing (420) the acquired multisensory data vector to at least one multisensory data vector of at least one grid point of a location fingerprinting map and determining a location of the mobile device based upon the comparison; and updating (428) the internal navigation system with the location while eliminating the internal navigation system accumulated drift.

The multisensory data vector comprises earth magnetic field readings and communication related electromagnetic signals; wherein the determining (420) of the location may include calculating (425) a location estimate of the mobile device based upon a comparison between communication related electromagnetic signals acquired by the mobile device and communication related electromagnetic signals of the at least one grid point of the location fingerprinting map; and updating (426) the location estimate based upon a comparison between each magnetic field readings acquired by the mobile device and magnetic field readings of the at least one grid point of the location fingerprinting map.

Figure 27:
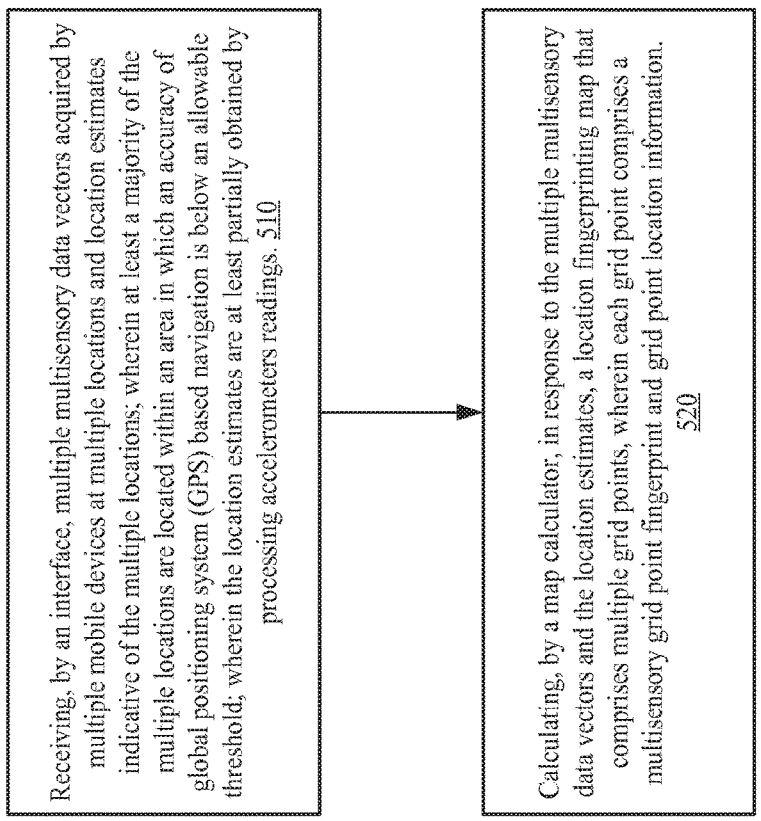

FIG. 27 illustrates a method 500 according to an embodiment of the invention.

Method 500 may include: receiving (510), by an interface or automatically, multiple multisensory data vectors acquired by multiple mobile devices at multiple locations and location estimates indicative of the multiple locations; wherein at least a majority of the multiple locations are located within an area in which an accuracy of global positioning system (GPS) based navigation is below an allowable threshold; wherein the location estimates are at least partially obtained by processing accelerometers readings; and calculating (520), by a map calculator, in response to the multiple multisensory data vectors and the location estimates, a location fingerprinting map that comprises multiple grid points, wherein each grid point comprises a multisensory grid point fingerprint and grid point location information.

Figure 28:
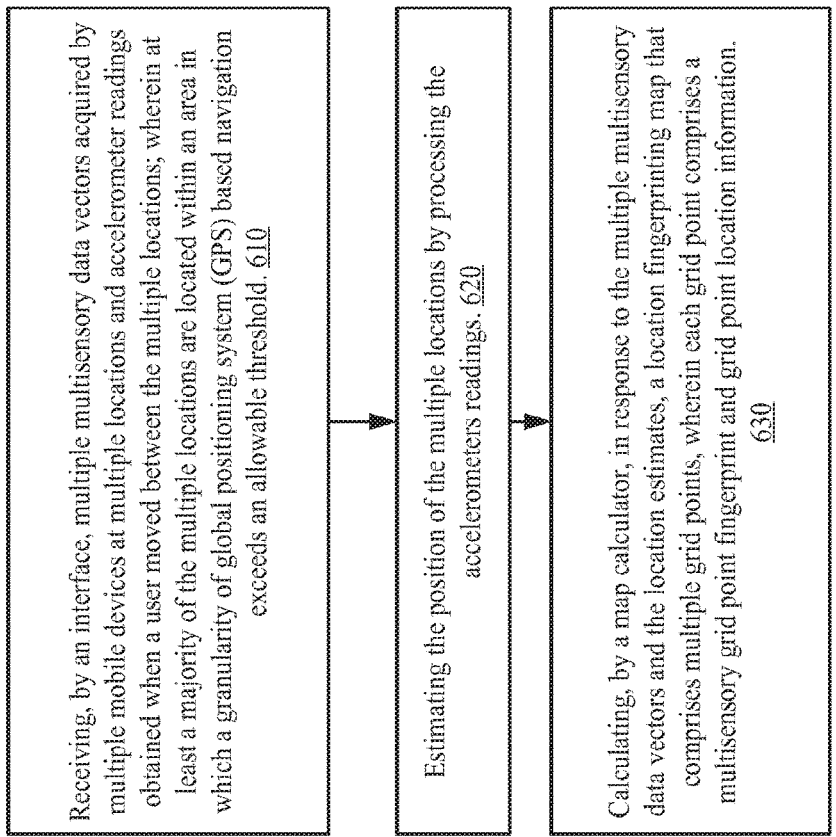

FIG. 28 illustrates a method 600 according to an embodiment of the invention.

Method 600 may include: receiving (610), by an interface or automatically, multiple multisensory data vectors acquired by multiple mobile devices at multiple locations and accelerometer readings obtained when a user moved between the multiple locations; wherein at least a majority of the multiple locations are located within an area in which an accuracy of global positioning system (GPS) based navigation is below an allowable threshold; estimating (620) the position of the multiple locations by processing the accelerometers readings; and calculating (630), by a map calculator, in response to the multiple multisensory data vectors and the location estimates, a location fingerprinting map that comprises multiple grid points, wherein each grid point comprises a multisensory grid point fingerprint and grid point location information.

The estimating (620) may include extracting, out of accelerometer readings, information relating to multiple walking phases; and processing accelerometer information relating to two walking phases to determine a direction of propagation of a user.

The estimating (620) may include detecting maximal accelerometer readings related to first and third walking phases out of four walking phases; and determining the direction of propagation of the user in response to the maximal accelerometer readings.

The estimating (620) may include detecting maximal accelerometer readings related to second and fourth walking phases and estimating the direction of propagation of the user in response to the maximal accelerometer readings related to each one of the first till fourth walking phases.

FIG. 29 illustrates a system 700 according to an embodiment of the invention.

System 700 includes a computer 710 that can receive information from multiple mobile devices 720. The computer 710 can be a server or any other type of computer. The computer can include a communication interface 712 and a map calculator 714. The mobile devices 720 may have multiple sensors 721 and 722. The number of sensors and their types may exceed two. For simplicity of explanation only one of the mobile devices is shown in the figure as including multiple sensors 721 and 722.

System 700 can execute any of the mentioned above methods. For example, computer 710 can execute any of these methods mentioned above while the mobile devices 720 may execute method 400. The mobile devices 720 may host an application that receives the map.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A computerized method for building a multisensory location map, comprising the steps of:

receiving, by an interface, multiple multisensory data vectors acquired by multiple mobile devices at multiple locations and accelerometer readings obtained upon movement of at least one device carried by at least one user between the multiple locations; at least a portion of said movement being walking; at least a majority of the multiple locations are located within an area in which an accuracy of global positioning system (GPS) based navigation is below an allowable threshold;

extracting, out of accelerometers readings, accelerometer information related to multiple walking phases of the walking; for at least two of said multiple walking phases, by means of said accelerometer information, real-time correcting a currently measured Z vector, and a pitch angle and a roll angle thereof, thereby compensating for horizontal accelerations, thereby obtaining a Z vector pointing toward Earth's center;

calculating, from said Z vector pointing toward Earth's center, a surface parallel to Earth's face (perpendicular to said Z vector pointing toward Earth's center);

estimating, from said surface parallel to Earth's face and from a magnetic north measured by at least one built-in magnetometer in said at least one device, an offset selected from a group consisting of: an azimuth offset from magnetic north and a heading offset from geometric north;

processing the accelerometer information related to said at least two of said multiple walking phases to determine a direction of propagation of the at least one user and correcting said direction of propagation based on said offset;

estimating, from said corrected direction of propagation, at least one location of said at least one user; and calculating, by a map calculator, in response to the multiple multisensory data vectors and said at least one estimated location, a location fingerprinting map that comprises multiple grid points, each of the multiple grid point comprising a multisensory grid point fingerprint and grid point location information derivable from said at least one estimated location.

2. The computerized method according to claim 1, further comprising:

processing location information indicative of paths of multiple users within the indoor area to provide path information indicative of paths of the multiple users; and processing the path information to generate an estimated three-dimensional map of the indoor area.

3. The computerized method according to claim 1, wherein at least one of the multiple multisensory data vectors comprises at least one of: ambient noise, temperature, and earth magnetic field information.

4. The computerized method according to claim 1, wherein at least one of the multiple multisensory data vectors comprises pedometer information.

* * * * *